(12) United States Patent
Esenlik et al.

(10) Patent No.: US 11,190,807 B2
(45) Date of Patent: Nov. 30, 2021

(54) SYNTAX PREDICTION USING RECONSTRUCTED SAMPLES

(71) Applicant: Huawei Technologies Co., Ltd., Shenzhen (CN)

(72) Inventors: Semih Esenlik, Munich (DE); Anand Meher Kotra, Munich (DE); Zhijie Zhao, Munich (DE); Han Gao, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/863,986

(22) Filed: Apr. 30, 2020

(65) Prior Publication Data

US 2020/0260119 A1    Aug. 13, 2020

Related U.S. Application Data

(63) Continuation of application No. PCT/EP2017/080722, filed on Nov. 28, 2017.

(51) Int. Cl.
| | | |
|---|---|---|
| *H04N 19/70* | (2014.01) | |
| *H04N 19/13* | (2014.01) | |
| *H04N 19/176* | (2014.01) | |
| *H04N 19/46* | (2014.01) | |
| *H04N 19/124* | (2014.01) | |
| *H04N 19/159* | (2014.01) | |

(Continued)

(52) U.S. Cl.
CPC ............ *H04N 19/70* (2014.11); *H04N 19/13* (2014.11); *H04N 19/176* (2014.11); *H04N 19/46* (2014.11); *H04N 19/124* (2014.11); *H04N 19/159* (2014.11); *H04N 19/51* (2014.11); *H04N 19/619* (2014.11); *H04N 19/82* (2014.11)

(58) Field of Classification Search
None
See application file for complete search history.

(56) References Cited

U.S. PATENT DOCUMENTS 8,576,097 B2 * 11/2013 Ugur .................. H04N 19/13
                                                    341/51
2008/0165858 A1    7/2008 Karczewicz et al.
(Continued)

FOREIGN PATENT DOCUMENTS

| CN | 101637024 A | 1/2010 |
|---|---|---|
| CN | 103797794 A | 5/2014 |

(Continued)

OTHER PUBLICATIONS

Wang et al., "Context-Based 2D-VLC for Video Coding," 2004 IEEE International Conference on Multimedia and Expo (ICME), XP010770751, pp. 89-92, Institute of Electrical and Electronics Engineers, New York, New York (Jun. 2004).

(Continued)

*Primary Examiner* — Christopher Braniff
(74) *Attorney, Agent, or Firm* — Leydig, Voit & Mayer, Ltd.

(57) ABSTRACT

An encoder and a decoder respectively encode and decode signal and syntax elements to/from a bitstream. In the encoding/decoding, semantics for the syntax elements are derived in accordance with previously decoded signal samples. Such encoding/decoding is applicable for instance to a video or audio signal.

18 Claims, 10 Drawing Sheets

(51) Int. Cl.
*H04N 19/51* (2014.01)
*H04N 19/61* (2014.01)
*H04N 19/85* (2014.01)
*H04N 19/82* (2014.01)

(56) References Cited

U.S. PATENT DOCUMENTS

| | | | | |
|---|---|---|---|---|
| 2011/0064140 A1* | 3/2011 | Jang | ....................... | H04N 19/70 375/240.25 |
| 2013/0114693 A1 | 5/2013 | Gao et al. | | |
| 2013/0336382 A1 | 12/2013 | Rojals et al. | | |
| 2014/0211850 A1 | 7/2014 | Zhang et al. | | |
| 2015/0373315 A1 | 12/2015 | Chen et al. | | |
| 2016/0337662 A1 | 11/2016 | Pang et al. | | |

FOREIGN PATENT DOCUMENTS

| | | |
|---|---|---|
| CN | 104380748 A | 2/2015 |
| CN | 105230020 A | 1/2016 |
| CN | 106973295 A | 7/2017 |
| WO | 2011146105 A1 | 11/2011 |

OTHER PUBLICATIONS

Davies et al., "Suggestion for a Test Model," Joint Collaborative Team on Video Coding (JCT-VC) of ITU-T SG16 WP3 and ISO/IEC JTC1/SC29/WG11, 1st Meeting: Dresden, DE, JCTVC-A033, XP030007526, pp. 1-32 (Apr. 15-23, 2010).

Karczewicz et al., "CBP Coding Enhancements for CGS Enhancement Layer," Joint Video Team (JVT) of ISO/IEC MPEG and ITU-T VCEG (ISO/IEC JTC1 /SC29/WG11 and ITU-T SG16 Q.6), JVT-V092, 22nd Meeting: Marrakech, Morocco, XP030006900, pp. 1-5 (Jan. 13-19, 2007).

Chen et al., "Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting: Chengdu, CN, JVET-D0029, pp. 1-4 (Oct. 15-21, 2016).

"Arithmetic coding," From Wikipedia, the free encyclopedia, Website: https://en.wikipedia.org/wiki/Arithmetic_coding, pp. 1-13, Retrieved from the internet on: May 7, 2020.

"Series H: Audiovisual and Multimedia Systems, Infrastructure of audiovisual services—Coding of moving video. Advanced video coding for generic audiovisual services," Recommendation of ITU-T H.264, ITU-T Telecommunication Standardization Sector of ITU, 812 pages, International Telecommunication Union, Geneva, Switzerland (Apr. 2017).

"Series H: Audiovisual and Multimedia Systems Infrastructure of audiovisiual services—Coding of moving video. High efficiency video coding," Recommendation of ITU-T H.265, ITU-T Telecommunication Standardization Sector of ITU, H.265, 664 pages, International Telecommunication Union, Geneva, Switzerland (Dec. 2016).

Sze et al., "Chapter 8: Entropy Coding in HEVC," High Efficiency Video Coding (HEVC): Algorithms and Architectures, pp. 209-274, Springer International Publishing, Switzerland (2014).

Bross et al., "Chapter 5: Inter-Picture Prediction in HEVC," High Efficiency Video Coding (HEVC): Algorithms and Architectures, pp. 113-140, Springer International Publishing, Switzerland (2014).

Chen et al., "Algorithm Description of Joint Exploration Test Model 1" Joint Video Exploration Team (JVET) of ITU-T SG 16 WP 3 and ISO/IEC JTC 1/SC 29/WG 11, JVET-A1001, Geneva, CH, total 27 pages (Oct. 19-21, 2015).

Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, JVET-G1001-v1 (Jul. 13-21, 2017).

Bross et al., "Motion Data Coding," Section 5.2, High Efficiency Video Coding (HEVC): Algorithms and Architectures, High Efficiency Video Coding (HEVC), pp. 115-129 (2014).

* cited by examiner

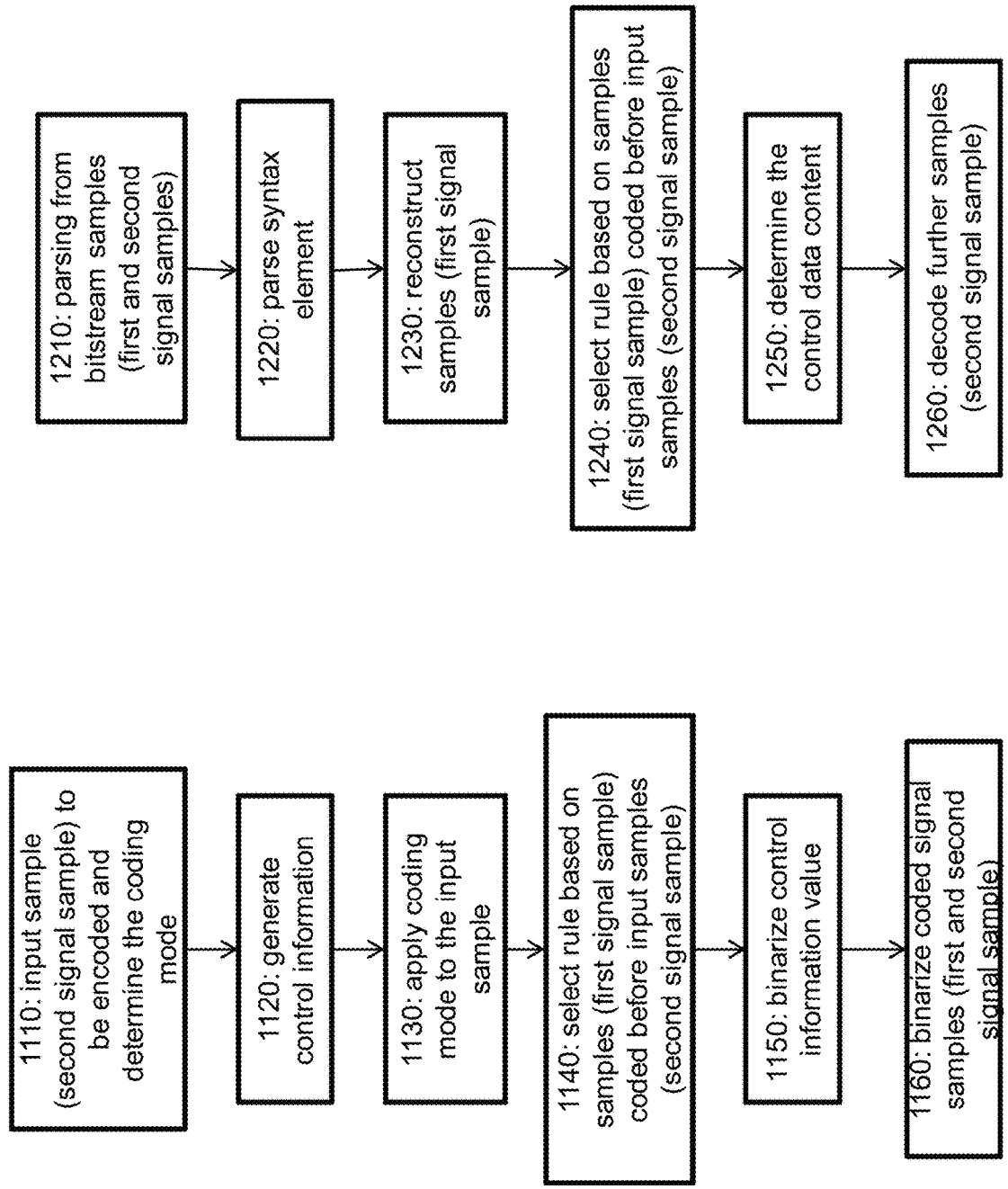

SYNTAX PREDICTION USING RECONSTRUCTED SAMPLES

CROSS-REFERENCE TO RELATED APPLICATIONS

This application is a continuation of International Application No. PCT/EP2017/080722, filed on Nov. 28, 2017, the disclosure of which is hereby incorporated by reference in its entirety.

FIELD

The present disclosure relates to coding of signal samples and control information relating to the signal sample coding, including binarization of the control information.

BACKGROUND

Current hybrid video codecs, such as H.264/AVC (Advanced Video Coding) or H.265/HEVC (High Efficient Video Coding), employ compression including predictive coding. A picture of a video sequence is subdivided into blocks of pixels and these blocks are then coded. Instead of coding a block pixel by pixel, the entire block is predicted using already encoded pixels in the spatial or temporal proximity of the block. The encoder further processes only the differences between the block and its prediction. The further processing typically includes a transformation of the block pixels into coefficients in a transformation domain. The coefficients may then be further compressed by means of quantization and further compacted by entropy coding to form a bitstream. The bitstream further includes any signaling information which enables the decoding of the encoded video. For instance, the signaling may include settings concerning the encoding, such as size of the input picture, frame rate, quantization step indication, prediction applied to the blocks of the pictures, or the like. The coded signaling information and the coded signal are ordered within the bitstream in a manner known to both the encoder and the decoder. This enables the decoder parsing the coded signaling information and the coded signal.

Temporal prediction exploits temporal correlation between pictures, also referred to as frames, of a video. The temporal prediction is also called inter-prediction, as it is a prediction using the dependencies between (inter) different video frames. Accordingly, a block being encoded, also referred to as a current block, is predicted from one or more previously encoded picture(s) referred to as a reference picture(s). A reference picture is not necessarily a picture preceding the current picture in which the current block is located in the displaying order of the video sequence. The encoder may encode the pictures in a coding order different from the displaying order. As a prediction of the current block, a co-located block in a reference picture may be determined. The co-located block is a block that is located in the reference picture on the same position as is the current block in the current picture. Such prediction is accurate for motionless picture regions, i.e. picture regions without movement from one picture to another.

In order to obtain a predictor that takes into account the movement, i.e. a motion compensated predictor, motion estimation is typically employed when determining the prediction of the current block. Accordingly, the current block is predicted by a block in the reference picture, which is located in a distance given by a motion vector from the position of the co-located block. In order to enable a decoder to determine the same prediction of the current block, the motion vector may be signaled in the bitstream. In order to further reduce the signaling overhead caused by signaling the motion vector for each of the blocks, the motion vector itself may be estimated. The motion vector estimation may be performed based on the motion vectors of the neighboring blocks in spatial and/or temporal domain.

The prediction of the current block may be computed using one reference picture or by weighting predictions obtained from two or more reference pictures. The reference picture may be an adjacent picture, i.e. a picture immediately preceding and/or the picture immediately following the current picture in the display order, because adjacent pictures are most likely to be similar to the current picture. However, in general, the reference picture also may be any other picture preceding or following the current picture in the displaying order and preceding the current picture in the bitstream (decoding order). This may provide advantages, for instance, in case of occlusions and/or non-linear movement in the video content. The reference picture identification also may thus be signaled in the bitstream.

A special mode of the inter-prediction is a so-called bi-prediction, in which two reference pictures are used in generating the prediction of the current block. In particular, two predictions determined in the respective two reference pictures are combined into a prediction signal of the current block. The bi-prediction may result in a more accurate prediction of the current block than the uni-prediction, i.e. prediction only using a single reference picture. The more accurate prediction leads to smaller differences between the pixels of the current block and the prediction (referred to also as "residuals"), which may be encoded more efficiently, i.e. compressed to a shorter bitstream. In general, more than two reference pictures may be used to find respective more than two reference blocks to predict the current block, i.e. a multi-reference inter prediction can be applied. The term multi-reference prediction thus includes bi-prediction as well as predictions using more than two reference pictures.

In order to provide more accurate motion estimation, the resolution of the reference picture may be enhanced by interpolating samples between pixels. Fractional pixel interpolation can be performed by weighted averaging of the closest pixels. In case of half-pixel resolution, for instance a bilinear interpolation is typically used. Other fractional pixels are calculated as an average of the closest pixels weighted by the inverse of the distance between the respective closest pixels to the pixel being predicted.

The motion vector estimation is a computationally complex task in which a similarity is calculated between the current block and the corresponding prediction blocks pointed to by candidate motion vectors in the reference picture. Typically, the search region includes M×M samples of the image and each of the sample position of the M×M candidate positions is tested. The test includes calculation of a similarity measure between the N×N reference block C and a block R, located at the tested candidate position of the search region. For its simplicity, the sum of absolute differences (SAD) is a measure frequently used for this purpose and given by:

$$SAD(x, y) = \sum_{i=0}^{N-1} \sum_{j=0}^{N-1} |R_{i,j}(x, y) - C_{i,j}|$$

In the above formula, x and y define the candidate position within the search region, while indices i and j denote samples within the reference block C and candidate block R. The candidate position is often referred to as block displacement or offset, which reflects the representation of the block matching as shifting of the reference block within the search region and calculating a similarity between the reference block C and the overlapped portion of the search region. In order to reduce the complexity, the number of candidate motion vectors is usually reduced by limiting the candidate motion vectors to a certain search space. The search space may be, for instance, defined by a number and/or positions of pixels surrounding the position in the reference picture corresponding to the position of the current block in the current image. After calculating SAD for all M×M candidate positions x and y, the best matching block R is the block on the position resulting in the lowest SAD, corresponding to the largest similarity with reference block C. On the other hand, the candidate motion vectors may be defined by a list of candidate motion vectors formed by motion vectors of neighboring blocks.

Motion vectors are usually at least partially determined at the encoder side and signaled to the decoder within the coded bitstream. However, the motion vectors may also be derived at the decoder. In such case, the current block is not available at the decoder and cannot be used for calculating the similarity to the blocks to which the candidate motion vectors point in the reference picture. Therefore, instead of the current block, a template is used, which is constructed out of pixels of already decoded blocks. For instance, already decoded pixels adjacent to the current block may be used. Such motion estimation provides an advantage of reducing the signaling: the motion vector is derived in the same way at both the encoder and the decoder; and thus, no signaling is needed. On the other hand, the accuracy of such motion estimation may be lower.

In order to provide a tradeoff between the accuracy and signaling overhead, the motion vector estimation may be divided into two steps: motion vector derivation and motion vector refinement. For instance, a motion vector derivation may include selection of a motion vector from the list of candidates. Such a selected motion vector may be further refined, for instance, by a search within a search space. The search in the search space is based on calculating cost function for each candidate motion vector, i.e. for each candidate position of block to which the candidate motion vector points.

Document JVET-D0029: Decoder-Side Motion Vector Refinement Based on Bilateral Template Matching, X. Chen, J. An, J. Zheng (the document can be found at: phenix.it-sudparis.eu/jvet/ site) shows motion vector refinement in which a first motion vector in integer pixel resolution is found and further refined by a search with a half-pixel resolution in a search space around the first motion vector.

Current audio codecs such as MP3, AMR, or AAC also compress the input audio signal and form a bitstream, which includes compressed audio samples and the corresponding signaling information necessary to decode the coded samples.

Irrespective of the kind of coded signal, the forming of the bitstream typically follows semantic and syntax rules, which are predefined, for instance, by a standard. The forming of the bitstream (binarization) may be performed by applying a fixed-length code or a variable-length code, i.e. a code with codewords having fixed or variable length. Semantic assigns signaling information (such as type of prediction which may have content "inter uni-prediction", "inter bi-prediction" or "intra-prediction") a value, which is typically a number (such as, respectively, 1, 2, and 3). Signaling information is typically included into a bitstream on a place defined by syntax, which is known to both the encoder and the decoder. Thus, typically, a bitstream includes a sequence of coded syntax elements. A syntax element is one or more bits carrying certain signaling (control) information, i.e. control information content. Following the above example with syntax element corresponding to type of prediction, such syntax element may take one of the values 1, 2, or 3 and is then embedded into the bitstream to indicate the type of the prediction (given by the semantic). In order to form the bitstream, the value of the syntax element is binarized, i.e. assigned a binary codeword. In order to encode 3 values with a fixed-length code, at least 2 bits are necessary. Two bits may take 4 different values (00, 01, 10, 11). Binarization of the above mentioned values 1, 2, and 3 may be performed by assigning them fixed-length (2-bit) codewords 00, 01, and 11. Depending on the expected distribution of the syntax elements value, it may be more beneficial to use a variable length coding such as arithmetic, Hamming or the like.

Definition of semantic, syntax and binarization for coding a signal has an impact on coding efficiency.

SUMMARY

The present disclosure provides for an efficient encoding and decoding of signal samples.

The present disclosure also provides for an efficient encoding and decoding of signal samples while maintaining the binarization independent of the compression.

This is achieved by adapting a semantic of a syntax element for control data according to previously encoded/decoded signal samples in order to code further signal samples.

According to an aspect of the disclosure, an apparatus is provided for encoding a signal into a bitstream, including a first signal sample and control information relating to encoding of a second signal sample. The encoder includes: a signal compressing unit configured to compress a first signal sample and to reconstruct the compressed first signal sample; a control information mapping unit configured to: (i) select a semantic rule for assignment between control information content and respective values of a syntax element according to the reconstructed first signal sample, and (ii) determine a value of the syntax element based on the semantic rule and control information content; and a bitstream generator configured to generate a bitstream, which includes the compressed first signal sample and the determined value of the syntax element.

One of the advantages of selecting the semantics based on already decoded samples is that the bitstream may be formed more efficiently. Moreover, the binarization is still independent of the signal coding, as the semantic adaption is performed before the actual bitstream forming. The adaption of semantics enables mapping of more probable control information contents on more probable occurring (and this, possibly more efficiently coded) syntax element values.

The bitstream generator may generate the bitstream by binarizing the compressed first signal sample and/or the determined value of the syntax element.

The apparatus may further comprise: a control information generation unit configured to generate the control information. The signal compressing unit is further configured to compress a second signal sample according to the generated control information. The bitstream generator is further configured to binarize the compressed second signal sample and to include the binarized second compressed signal sample into the bitstream.

According to an example, the bitstream generator is configured to perform the binarization of the syntax element value by applying a context-adaptive binary arithmetic coding (CABAC). CABAC is an efficient approach to binarize syntax elements with non-uniform probability of its values. The syntax adaption may be thus particularly efficient in combination with this coding.

It is noted that the term "bitstream" here is to be understood broadly as a set of binarized information including samples and control information according to a predefined syntax. It includes the possibility of any arbitrary packetization: data packets may be formed that combine binarized samples and the control information, or the control information and the coded samples may be transported in different packets.

The term "signal sample" here refers to one or more signal samples. In particular, it may be a block of samples, i.e. a block to which the control information content is related, for instance by defining a process by which the samples (block of samples) have been coded and thus, have to be decoded.

According to another aspect of the disclosure, an apparatus for decoding a signal from a bitstream including signal samples and control information relating to decoding of signal samples, the decoder comprising: a bitstream parser configured to parse from a bitstream a compressed first signal sample and a value of a syntax element; a signal decompressing unit configured to reconstruct the compressed first signal sample; and a control information mapping unit configured to: select a semantic rule for assignment between control information content and respective values of the syntax element according to the reconstructed first signal sample, and determine control information content based on the semantic rule and the parsed value of the syntax element.

For instance, the bitstream parser is further configured to parse from the bitstream a compressed second signal sample; and the signal decompressing unit is further configured to decompress the compressed second signal sample according to the determined control information.

The bitstream parser can be configured to perform the parsing of the syntax element value by applying a context-adaptive binary arithmetic decoding.

According to an embodiment, the semantic rule is determined as an index identifying one of a plurality of predefined tables associating the control information content and the respective values of the syntax element, the index being determined as a function of the reconstructed signal sample.

For example, the semantic rule is or may be a first table or a second table; the syntax element can take or comprise a plurality of different values and the control information can take or comprise a plurality of different control information contents. The first table associates one value of the plurality of different values of the syntax element with one (e.g. only one) control information content of the plurality of control information contents, and the second table associates the one value of the plurality of different values of the syntax element with one other (e.g. only one other) control information content of the plurality of control information contents. The same may apply for the apparatus for encoding.

For example, the semantic rule is either a first table or a second table; the syntax element can take either a first value or a second value; the first table associates the first value of the syntax element with a first control information content and a second value with a second control information content; and the second table associates the first value of the syntax element with the second control information content and the second value with the first control information content.

In particular, the signal may be a video signal. The present disclosure may be useful in particular for coding and decoding of syntax elements carrying control information for a video signal. This is because video compression has become scalable and is typically controlled by many various syntax elements. Moreover, since the syntax elements may be often signaled (for instance on a per-block basis), the control information may form a significant part of the bitstream.

In one example, when the signal is a video signal, the control information indicates with the first control information content a bi-prediction and with the second control information content a uni-prediction to be used in template matching to obtain signal sample predictor.

For instance, the first or second table is selected according to template matching cost function which is based on a similarity between the template and respectively a predictor based on bi-prediction and a predictor based on uni-prediction.

According to an example, the signal is a video signal; and the control information indicates with the first control information content a local illumination compensation switched on and with the second control information content the local illumination compensation switched off.

In some embodiments, the first or second table is selected according to a similarity function between the reconstructed sample in a current image frame and the corresponding reconstructed sample in an image frame preceding the current image frame in the encoding order.

When the signal is a video signal, for example, the control information indicates either a positive or negative sign of a component of a motion vector, the component being vertical or horizontal component.

The first or second table may be selected according to a similarity function between prediction blocks pointed to by motion vectors with the respective positive and negative sign and the samples surrounding the current block.

According to an aspect of the disclosure, an integrated circuit is provided embodying an apparatus (encoder and/or decoder) described above.

According to another aspect of the disclosure, a method is provided for encoding a signal into a bitstream including signal samples and control information relating to encoding of signal samples. The method comprising: compressing a first signal sample and reconstructing the compressed first signal sample; selecting a semantic rule for assignment between control information contents and respective values of a syntax element according to the reconstructed first signal sample, determining a value of the syntax element based on the semantic rule and control information content; and generating a bitstream by binarizing the compressed first signal sample and the determined value of the syntax element.

The method may further comprise: generating the control information compressing a second signal sample according to the generated control information; and binarizing the compressed second signal sample and including the binarized second compressed signal sample into the bitstream.

According to an example, the binarization of the syntax element value is performed by applying a context-adaptive binary arithmetic coding.

According to an aspect of the disclosure, a method is provided for decoding a signal from a bitstream including signal samples and control information relating to encoding of signal samples, the method comprising: parsing from a bitstream a compressed first signal sample and a value of a syntax element; reconstructing the compressed first signal sample; selecting a semantic rule for assignment between control information content and respective values of the syntax element according to the reconstructed first signal sample, and determining control information content based on the semantic rule and the parsed value of the syntax element.

For instance, the bitstream parser is further configured to parse from the bitstream a compressed second signal sample; and the signal decompressing unit is further configured to decompress the compressed second signal sample according to the determined control information.

The bitstream parser can be configured to perform the parsing of the syntax element value by applying a context-adaptive binary arithmetic decoding.

According to an embodiment, the semantic rule is determined as an index identifying one of a plurality of pre-defined tables associating the control information content and the respective values of the syntax element, the index being determined as a function of the reconstructed signal sample.

For example, the semantic rule is or may be a first table or a second table; the syntax element can take or comprise a plurality of different values and the control information can take or comprise a plurality of different control information contents; and wherein the first table associates one value of the plurality of different values of the syntax element with one (e.g. only one) control information content of the plurality of control information contents, and the second table associates the one value of the plurality of different values of the syntax element with one other (e.g. only one other) control information content of the plurality of control information contents. The same may apply for the method for encoding.

For example, the semantic rule is either a first table or a second table; the syntax element can take either a first value or a second value; the first table associates the first value of the syntax element with a first control information content and a second value with a second control information content; and the second table associates the first value of the syntax element with the second control information content and the second value with the first control information content.

In particular, the signal may be a video signal; and then the control information indicates with the first control information content a bi-prediction and with the second control information content a uni-prediction to be used in template matching to obtain signal sample predictor.

For instance, the first or second table is selected according to template matching cost function which is based on similarity between the template and respectively a predictor based on bi-prediction and a predictor based on uni-prediction.

According to an example, the signal is a video signal; and the control information indicates with the first control information content a local illumination compensation switched on and with the second control information content the local illumination compensation switched off.

In some embodiments, the first or second table is selected according to a similarity function between the reconstructed sample in a current image frame and the corresponding reconstructed sample in an image frame preceding the current image frame in the encoding order.

When the signal is a video signal, for example, the control information indicates either a positive or negative sign of a component of a motion vector, the component being a vertical or horizontal component.

The first or second table may be selected according to a similarity function between prediction blocks pointed to by motion vectors with the respective positive and negative sign and the samples surrounding the prediction block. More specifically the similarity function is used firstly to compare the samples surrounding the block to be predicted and the prediction block in the reference picture pointed by motion vectors with respective positive sign, in order to obtain similarity measure SM1. Secondly the similarity function is used to compare the samples surrounding the block to be predicted and the prediction block in the reference picture pointed by motion vectors with respective negative sign, in order to obtain the similarity measure SM2. The first table or the second table is selected according to a comparison between SM1 and SM2, e.g. first table is selected if SM1 is smaller than SM2.

For instance, a further step of parsing from the bitstream a compressed second signal sample is included in the method; as well as the step of decompressing the compressed second signal sample according to the determined control information.

The parsing of the syntax element value by applying a context-adaptive binary arithmetic decoding may be performed as well.

According to an embodiment, the semantic rule is determined as an index identifying one of a plurality of pre-defined tables associating the control information content and the respective values of the syntax element, the index being determined as a function of the reconstructed signal sample. For example, the semantic rule is either a first table or a second table; the syntax element can take either a first value or a second value; the first table associates the first value of the syntax element with a first control information content and a second value with a second control information content; and the second table associates the first value of the syntax element with the second control information content and the second value with the first control information content.

In particular, the signal may be a video signal; and then the control information indicates with the first control information content a bi-prediction and with the second control information content a uni-prediction to be used in template matching to obtain signal sample predictor.

For instance, the first or second table is selected according to template matching cost function, which is based on similarity between the template and respectively a predictor based on bi-prediction and a predictor based on uni-prediction.

According to an example, the signal is a video signal; and the control information indicates with the first control information content a local illumination compensation switched on and with the second control information content the local illumination compensation switched off.

In some embodiments, the first or second table is selected according to a similarity function between the reconstructed sample in a current image frame and the corresponding reconstructed sample in an image frame preceding the current image frame in the encoding order.

When the signal is a video signal, for example, the control information indicates either a positive or negative sign of a component of a motion vector, the component being a vertical or horizontal component.

The first or second table may be selected according to a similarity function between prediction blocks pointed to by motion vectors with the respective positive and negative sign and the samples surrounding the current block.

Moreover, according to another aspect of the disclosure, a non-transitory computer-readable medium is provided storing instructions which when executed on a processor perform the steps of a method as described above.

BRIEF DESCRIPTION OF DRAWINGS

In the following, exemplary embodiments are described in more detail with reference to the attached figures and drawings, in which:

FIG. 11 is a flow diagram illustrating an encoding method;

FIG. 12 is a flow diagram illustrating a decoding method; and

DETAILED DESCRIPTION

Figure 1:
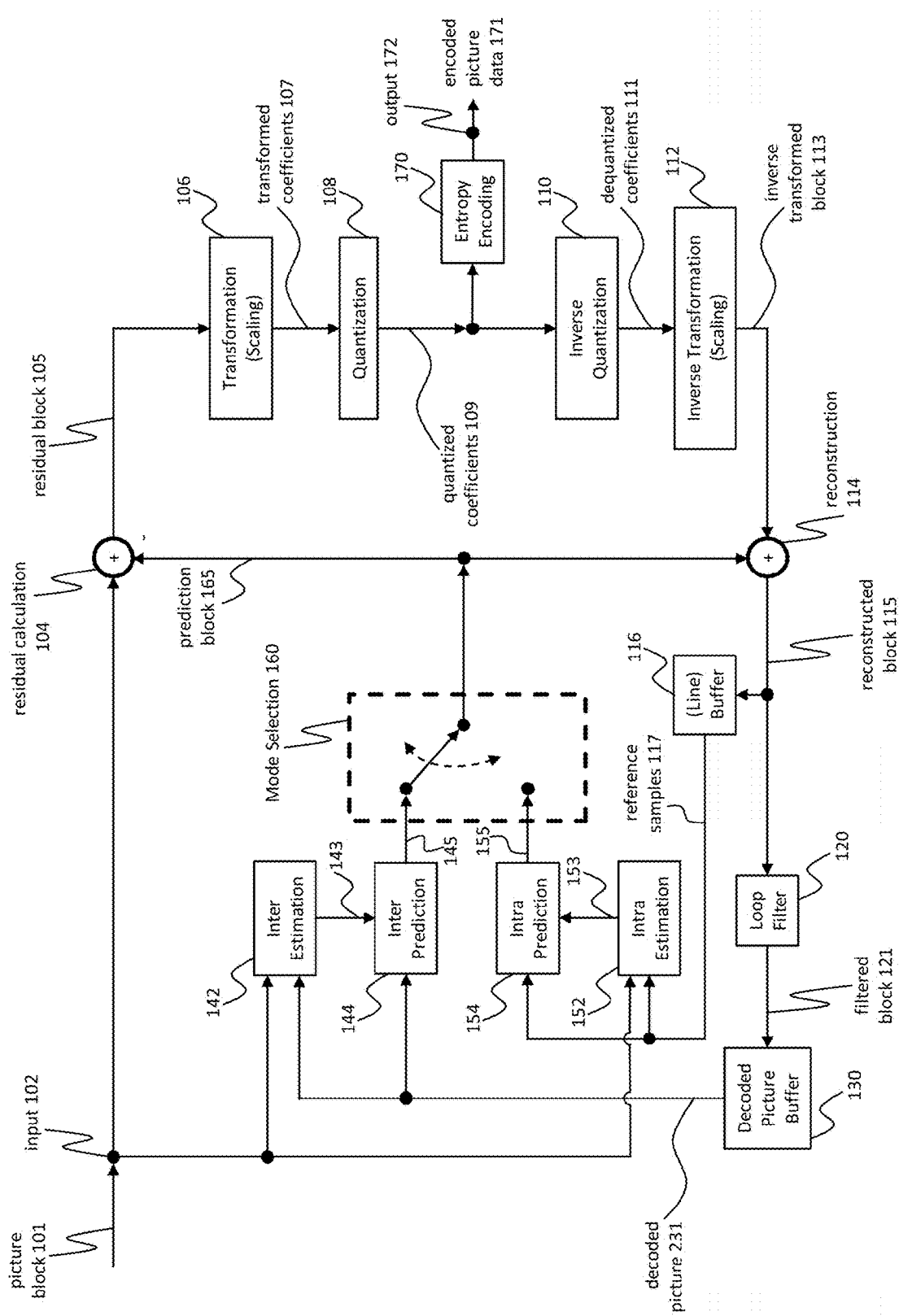
FIG. 1 is a block diagram showing an exemplary structure of an encoder for encoding video signals.

In the following description, reference is made to the accompanying figures, which form part of the disclosure, and which show, by way of illustration, aspects of embodiments of the disclosure or aspects in which embodiments of the present disclosure may be used. It is understood that embodiments of the disclosure may be used in other aspects and may include structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding apparatus, device, or system configured to perform the method, and vice versa. For example, if one or a plurality of method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

The present disclosure relates to signal encoding and decoding and, in particular, to encoding including application of semantics, forming a syntax element and binarizing it to generate a bitstream. The forming of a syntax element and the binarizing may also be performed in a single step, i.e. by directly assigning content of signaling information a syntax element value, which is a binary value.

According to the present disclosure, an encoding apparatus and a decoding apparatus are provided.

In an embodiment, an encoder is provided for encoding a signal into a bitstream carrying signal samples and control information relating to encoding of the signal samples. The signal samples are here digital values. They may be obtained by sampling a signal in predetermined one or more time instances (for instance regularly with a certain sampling frequency, or irregularly). The sampled values may be digitalized, for instance, using an analog-to-digital conversion. It is noted that the present disclosure is applicable to any signal samples, irrespectively of how they have been obtained. The encoder may receive the signal in form of digital samples from a storage or network, or directly from a sensor after analog-to-digital conversion, or in any other way.

The signal may be a one-dimensional signal, such as an audio signal or a sequence of measurement values of any other kind of signal. However, the signal may also be a two-dimensional signal, such as an image signal or video (motion picture) signal. In general, the present disclosure may be applied to any kind of signal.

The encoder of this exemplary embodiment includes a signal compressing unit configured to compress a first signal sample and reconstruct the compressed first signal sample. The term "compression" here refers to any kind of signal representation enabling the signal samples to be binarized. Typically, compression may be the hybrid coding of an image (such as JPEG, PNG or the like), a video (such as HEVC or AVC or the like), an audio (such as AMR, MP3, AAC or the like), a text compression or any other kind of compression. It is noted that the encoder does not necessarily have to include the compression unit as long as it obtains on its input the signal samples to be inserted into the bitstream and require additional signaling information as to how their insertion is to be performed so that a decoder can reconstruct it. It is noted that if a video coding is used, then the compression may include prediction (temporal or spatial), transformation (such as discrete Fourier transform (DFT) or fast Fourier transform (FFT) or the like) and quantization (actual lossy compression). However, not all these compression parts must be included. There does not have to be transformation as for certain contents, pixel encoding may provide better values; there does not need to be predictive coding and some samples are not necessarily quantized. In general, the term "compression" may refer to any kind of coding.

Correspondingly, the term decompression may be any type of decoding corresponding to the encoding as mentioned above. The term "sample" or "samples" may also employ a block of samples, since most encoding/decoding approaches nowadays are block-based, with possibly variable block size signaled in the bitstream.

The encoder further includes a control information mapping unit configured to:
- select a semantic rule for assignment between control information content and respective values of a syntax element according to the reconstructed first signal sample, and
- determine value of the syntax element based on the semantic rule and control information content.

Here, the term control information is used as a synonym to the term signaling information. The term "control" refers to the fact that the content of the control information controls the encoding/decoding of the signal samples. The term "signaling" refers to the fact that the information is to be included into the bitstream, i.e. signaled to the decoder.

The control information mapping unit (in other words "a mapper") uses a semantic rule to map possible signaling information contents to respective values of a syntax element to be included into the bitstream. The semantic rule here is in general dependent on one or more signal sample value(s). In particular, in order to enable the determination of the semantic rule in the same way at the encoder and the decoder, the one or more signal sample(s) used to determine the semantic rule are to be the same at the encoder and the decoder. Accordingly, if a lossy compression is applied to the signal samples before their inclusion into the bitstream, then at the encoder, the compressed and reconstructed (decompressed) signal samples should be used to determine the semantic rule. However, the present disclosure is not limited to cases in which the compression is a lossy compression. In cases in which a lossless compression is applied, so that original signal sample can be recovered, the reconstructed signal samples correspond to the input signal samples.

The syntax element value then depends on the semantic rule which maps the signaling information content and on the signaling information content. The encoder further comprises a bitstream generator configured to generate a bitstream by binarizing the compressed first signal sample and the determined value of the syntax element. It is noted that in general, the functionality of binarization does not have to be performed by a separate binarization unit. The mapper (the control information mapping unit) can correspond to the bitstream generator and directly assign to the signaling information the binary value. This approach may be beneficial especially in cases when the binarization is performed by assigning to the signaling information content a fixed-length code so that no further binarization by entropy (variable length) coding is necessary.

In other words, an encoder of the present disclosure includes a mapper or binarizer for mapping signaling information content to a codeword. The semantic rule determines how the possible pieces of signaling information content are to be mapped onto the respective codewords. The semantic rule is given by the signal sample value(s). In order to enable an efficient implementation, the semantic rule depends on previously binarized samples, i.e. samples included in the current bitstream already and the content of the signaling information coded used the semantic rule is used for encoding samples still to be included into the current bitstream. Such organization of the bitstream enables decoding which does not require additional memory for storing the samples while waiting for reception of the signaling information necessary for their decoding.

In order to achieve this, the encoder further includes a control information generation unit configured to generate the signaling information. The signaling may be generated for instance based on analyzing the input signal samples to be encoded and selecting encoding leading to minimum cost, for instance to a shortest bitstream or an optimum cost function such as a rate-distortion or a rate-distortion-complexity function.

The signal compressing unit is then further configured to compress a second signal sample according to the generated control information. Correspondingly, the bitstream generator is further configured to binarize the compressed second signal sample and to include the binarized second compressed signal sample into the bitstream.

In other words, the above mentioned first signal sample may be one or more signal samples which were already included into the bitstream. The second signal sample or samples are the samples which are to be coded using the generated control information.

The present disclosure may be used in video coding and decoding as is illustrated in the following exemplary embodiment.

FIG. 1 shows an encoder 100 which comprises an input for receiving input image samples of frames or pictures of a video stream and an output for generating an encoded video bitstream. The term "frame" in this disclosure is used as a synonym for picture. However, it is noted that the present disclosure is also applicable to fields in case interlacing is applied. In general, a picture includes m times n pixels. This corresponds to image samples and may comprise one or more color components. For the sake of simplicity, the following description refers to pixels meaning samples of luminance. However, it is noted that the motion vector search of the disclosure can be applied to any color component including chrominance or components of a search space such as RGB or the like. On the other hand, it may be beneficial to only perform motion vector estimation for one component and to apply the determined motion vector to more (or all) components.

The input blocks to be coded do not necessarily have the same size. One picture may include blocks of different sizes and the block raster of different pictures may also differ.

In an explicative realization, the encoder 100 is configured to apply prediction, transformation, quantization, and entropy coding to the video stream. The transformation, quantization, and entropy coding are carried out respectively by a transform unit 106, a quantization unit 108 and an entropy encoding unit 170 so as to generate as an output the encoded video bitstream.

The video stream may include a plurality of frames, wherein each frame is divided into blocks of a certain size that are either intra or inter coded. The blocks of for example the first frame of the video stream are intra coded by means of an intra prediction unit 154. An intra frame is coded using only the information within the same frame, so that it can be independently decoded and it can provide an entry point in the bitstream for random access. Blocks of other frames of the video stream may be inter coded by means of an inter prediction unit 144: information from previously coded frames (reference frames) is used to reduce the temporal redundancy, so that each block of an inter-coded frame is predicted from a block in a reference frame. A mode selection unit 160 is configured to select whether a block of a frame is to be processed by the intra prediction unit 154 or the inter prediction unit 144. This mode selection unit 160 also controls the parameters of intra or inter prediction. In order to enable refreshing of the image information, intra-coded blocks may be provided within inter-coded frames. Moreover, intra-frames which contain only intra-coded blocks may be regularly inserted into the video sequence in order to provide entry points for decoding, i.e. points where the decoder can start decoding without having information from the previously coded frames.

The intra estimation unit 152 and the intra prediction unit 154 are units which perform the intra prediction. In particular, the intra estimation unit 152 may derive the prediction mode based also on the knowledge of the original image while intra prediction unit 154 provides the corresponding predictor, i.e. samples predicted using the selected prediction mode, for the difference coding. For performing spatial or temporal prediction, the coded blocks may be further processed by an inverse quantization unit 110, and an inverse transform unit 112. After reconstruction of the block a loop filtering unit 120 is applied to further improve the quality of the decoded image. The filtered blocks then form the reference frames that are then stored in a decoded picture buffer 130. Such decoding loop (decoder) at the encoder side provides the advantage of producing reference frames which are the same as the reference pictures reconstructed at the decoder side. Accordingly, the encoder and decoder side operate in a corresponding manner. The term "reconstruction" here refers to obtaining the reconstructed block by adding to the decoded residual block the prediction block.

The inter estimation unit 142 receives as an input a block of a current frame or picture to be inter coded and one or several reference frames from the decoded picture buffer 130. Motion estimation is performed by the inter estimation unit 142, whereas motion compensation is applied by the inter prediction unit 144. The motion estimation is used to obtain a motion vector and a reference frame based on certain cost function, for instance using also the original image to be coded. For example, the motion estimation unit 142 may provide initial motion vector estimation. The initial motion vector may then be signaled within the bitstream in form of the vector directly or as an index referring to a motion vector candidate within a list of candidates constructed based on a predetermined rule in the same way at the encoder and the decoder. The motion compensation then derives a predictor of the current block as a translation of a block co-located with the current block in the reference frame to the reference block in the reference frame, i.e. by a motion vector. The inter prediction unit 144 outputs the prediction block for the current block, wherein the prediction block minimizes the cost function. For instance, the cost function may be a difference between the current block to be coded and its prediction block, i.e. the cost function minimizes the residual block. The minimization of the residual block is based, e.g., on calculating a sum of absolute differences (SAD) between all pixels (samples) of the current block and the candidate block in the candidate reference picture. However, in general, any other similarity metric may be employed, such as mean square error (MSE) or structural similarity metric (SSIM).

However, cost-function may also be the number of bits necessary to code such inter-block and/or distortion resulting from such coding. Thus, the rate-distortion optimization procedure may be used to decide on the motion vector selection and/or in general on the encoding parameters, such as whether to use inter or intra prediction for a block and with which settings.

The intra estimation unit 152 and inter prediction unit 154 receive as an input a block of a current frame or picture to be intra coded and one or several reference samples from an already reconstructed area of the current frame. The intra prediction then describes pixels of a current block of the current frame in terms of a function of reference samples of the current frame. The intra prediction unit 154 outputs a prediction block for the current block, wherein the prediction block advantageously minimizes the difference between the current block to be coded and its prediction block, i.e., it minimizes the residual block. The minimization of the residual block can be based, e.g., on a rate-distortion optimization procedure. In particular, the prediction block is obtained as a directional interpolation of the reference samples. The direction may be determined by the rate-distortion optimization and/or by calculating a similarity measure as mentioned above in connection with inter-prediction.

The inter estimation unit 142 receives as an input a block or a more universal-formed image sample of a current frame or picture to be inter coded and two or more already decoded pictures 231. The inter prediction then describes a current image sample of the current frame in terms of motion vectors to reference image samples of the reference pictures. The inter prediction unit 142 outputs one or more motion vectors for the current image sample, wherein the reference image samples pointed to by the motion vectors advantageously minimize the difference between the current image sample to be coded and its reference image samples, i.e., it minimizes the residual image sample. The predictor for the current block is then provided by the inter prediction unit 144 for the difference coding.

The difference between the current block and its prediction, i.e. the residual block 105, is then transformed by the transform unit 106. The transform coefficients 107 are quantized by the quantization unit 108 and entropy coded by the entropy encoding unit 170. The thus generated encoded picture data 171, i.e. encoded video bitstream, comprises intra coded blocks and inter coded blocks and the corresponding signaling (such as the mode indication, indication of the motion vector, and/or intra-prediction direction). The transform unit 106 may apply a linear transformation, such as a Fourier or Discrete Cosine Transformation (DFT/FFT or DCT). Such transformation into the spatial frequency domain provides the advantage that the resulting coefficients 107 have typically higher values in the lower frequencies. Thus, after an effective coefficient scanning (such as zig-zag), and quantization, the resulting sequence of values has typically some larger values at the beginning and ends with a run of zeros. This enables further efficient coding. Quantization unit 108 performs the actual lossy compression by reducing the resolution of the coefficient values.

The entropy coding unit 170 then assigns to coefficient values binary codewords to produce a bitstream. The entropy coding unit 170 also codes (generates syntax element value and binarizes it) the signaling information (not shown in FIG. 1). Thus, the above described encoder may be implemented as a part of the entropy coding unit 170.

As mentioned above, the binarization may be performed in any way. Advantageously, the bitstream generator is configured to perform the binarization of the syntax element value by applying a context-adaptive binary arithmetic coding (CABAC). The CABAC has been used recently in AVC and HEVC video coding standards but may also be used for any other kind of signals. This kind of entropy coding provides a high efficiency, close to the theoretical bound.

Figure 3:
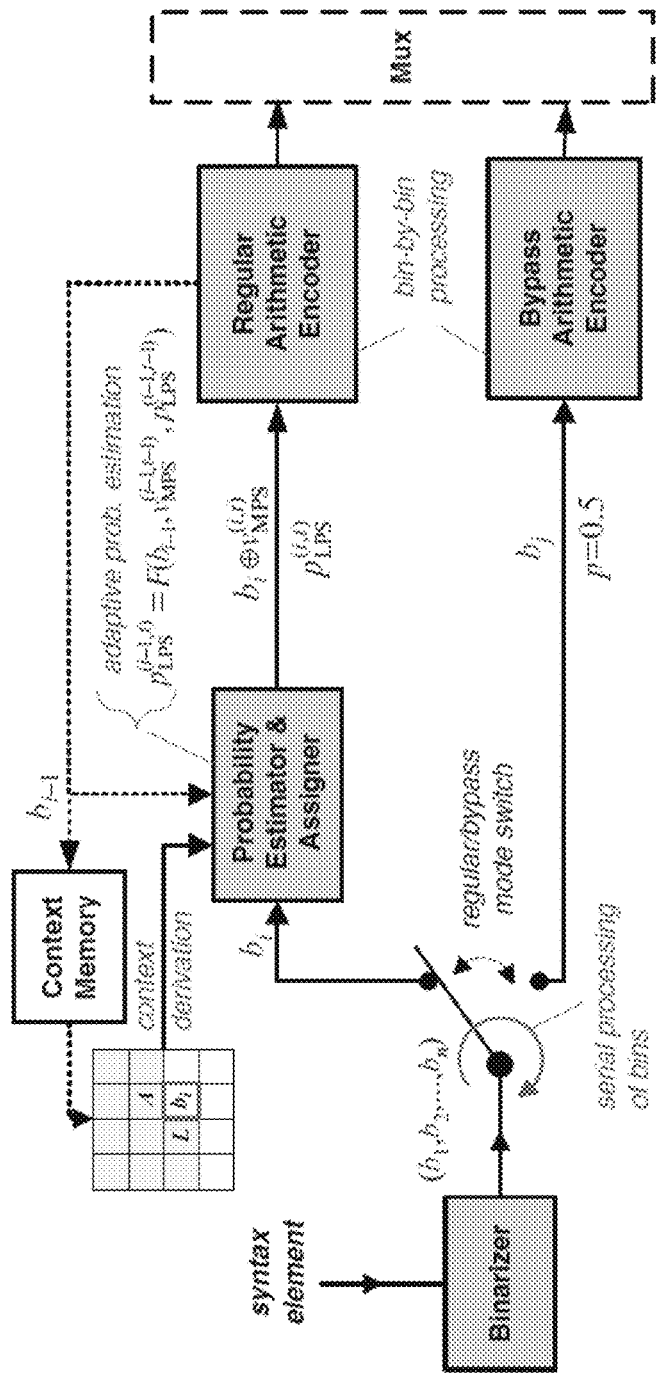
FIG. 3 is a block diagram illustrating an encoder including an arithmetic encoder.

An example of a CABAC encoder as the one used in HEVC is shown in FIG. 3. In particular, a syntax element value is inserted into the binarizer. The binarizer outputs for the syntax element a binary value, namely bits b1, b2, . . . , bn. These bits are further encoded either by using a regular arithmetic coding or bypass arithmetic coding. The regular arithmetic coding encodes a syntax element (or a part of it) using a context model (probability distribution specific to that syntax element). The context model tables are populated and continuously updated according to statistical properties of each coded block as illustrated in FIG. 3. Since the context models are continuously updated, they can be considered as a form of syntax prediction. The context derivation usually considers previously coded syntax elements, and according to the derived context, one of multiple context models (probability models) are selected. Therefore it can be said that in the HEVC CABAC, the syntax prediction is applied only considering the previously coded syntax elements.

The CABAC context model tables are reset at specified points (such as at the end of each tile), in order to create independent bitstreams. It is only possible to start decoding/encoding a CABAC bitstream at the specified points, where the context models are reset. Also if there is an error in encoding/decoding of a syntax element, the associated context model will be updated wrongly, creating an error that propagates till the end of the bitstream. The details of the CABAC encoder shown in FIG. 3 are described in Sze, Vivienne, and Detlev Marpe. "Entropy Coding in HEVC." High Efficiency Video Coding (HEVC) (2014): 209-274. Link: dspace.mit.edu/handle/1721.1/100315.".

However, it is noted that the present disclosure is not limited to the video coding or to the CABAC coding. In general, the present disclosure is also applicable to AVC and CAVLC (context-adaptive variable length coding) coding or to any variable-length or fixed coding. The present disclosure may be applied to new codecs irrespectively of their particular way of binarization of the samples and the syntax elements.

According to another embodiment of the disclosure, a decoder is provided for decoding a signal from a bitstream including signal samples and control information relating to encoding of signal samples. This decoder is capable of decoding the bitstream produced by the encoder described above.

In order to achieve this, the decoder comprises a bitstream parser configured to parse from the bitstream the (compressed) first signal sample and the value of the syntax element. The term "parsing" here refers to the extraction of the sample and the syntax element value from the bitstream. Parsing is possible since the syntax of the bitstream is known to the decoder.

Moreover, the decoder may comprise a signal decompressing unit configured to reconstruct the compressed first signal sample. This unit is may perform decoding (decompression) of the lossless or lossy-coded signal. In case no compression was applied, this unit corresponds to the parser which provides the signal samples without further processing. The signal samples may be merely extracted from the bitstream. The term decompression refers for instance in FIG. 2 to any of the processes of Intra/Inter prediction, reconstruction (214), loop filter, inverse transformation and inverse quantization.

The decoder further comprises a control information mapping unit (the demapper) configured to:
determine (derive) a semantic rule for assignment between control information content and respective values of the syntax element according to the reconstructed first signal sample, and
determine control information content based on the semantic rule and the parsed value of the syntax element.

The demapper determines the semantic rule in the same way as the encoder did. Since the first signal sample has already been reconstructed and thus extracted from the bitstream, it can be used to select the semantic rule. Then, the control information content is determined by using the mapping defined by the semantic rule to obtain the control information content from the syntax element value extracted from the bitstream.

The bitstream parser may be further configured to parse from the bitstream a compressed second signal sample and the signal decompressing unit may further configured to decompress the compressed second signal sample according to the determined control information.

Figure 2:
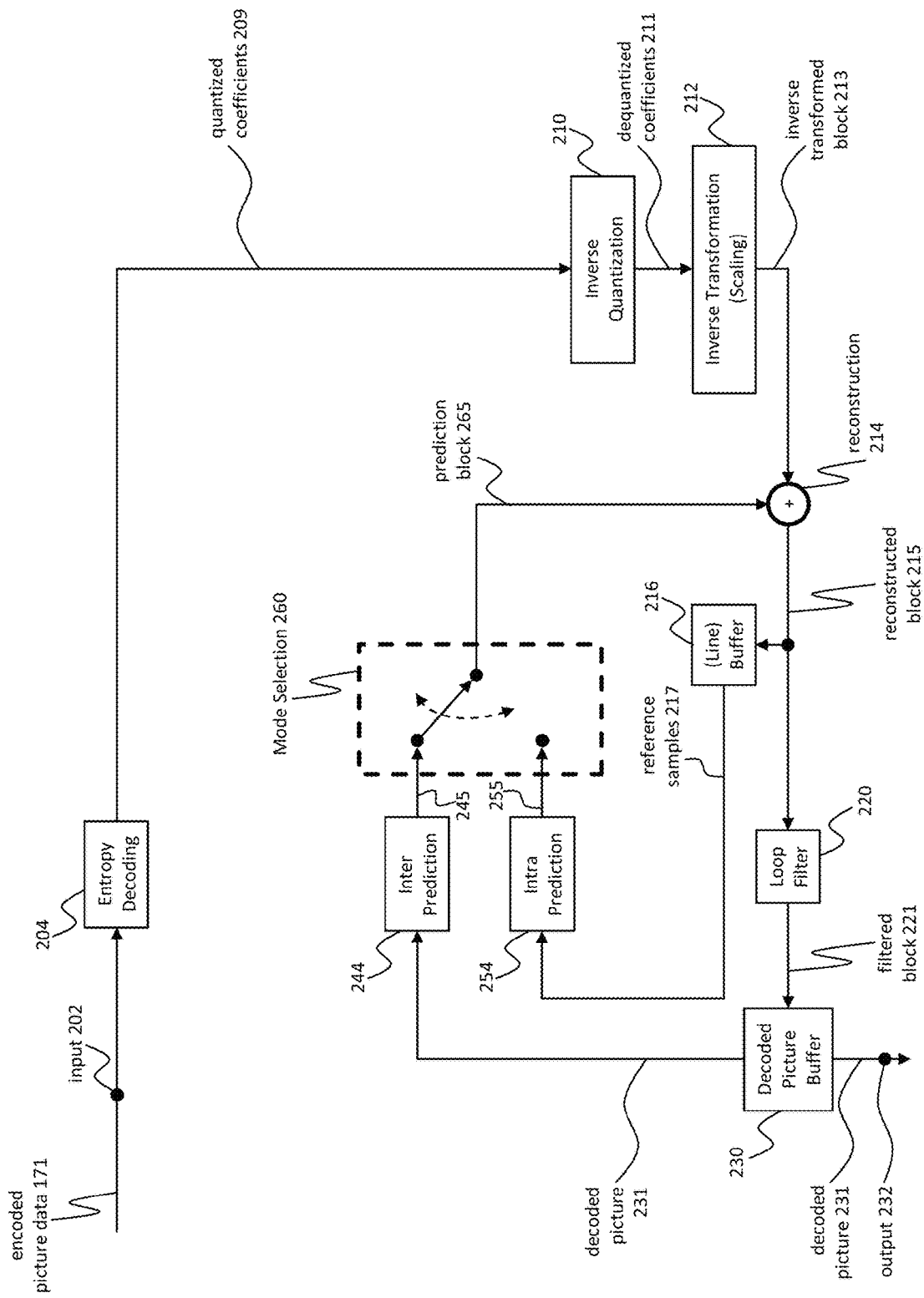
FIG. 2 is a block diagram showing an exemplary structure of a decoder for decoding video signals.

Similarly as the encoder described in the corresponding embodiment above, the decoder may be applied to decode a video signal and may be a part of the video decoder as shown in FIG. 2.

FIG. 2 shows a video decoder 200. The video decoder 200 comprises particularly a decoded picture buffer 230, an inter prediction unit 244 and an intra prediction unit 254, which is a block prediction unit. The decoded picture buffer 230 is configured to store at least one (for uni-prediction) or at least two (for bi-prediction) reference frames reconstructed from the encoded video bitstream, the reference frames being different from a current frame (currently decoded frame) of the encoded video bitstream. The intra prediction unit 254 is configured to generate a prediction block, which is an estimate of the block to be decoded. The intra prediction unit 254 is configured to generate this prediction based on reference samples that are obtained from the decoded picture buffer 230.

The decoder 200 is configured to decode the encoded video bitstream generated by the video encoder 100, and preferably both the decoder 200 and the encoder 100 generate identical predictions for the respective block to be encoded/decoded. The features of the decoded picture buffer 230 and the intra prediction unit 254 are similar to the features of the decoded picture buffer 130 and the intra prediction unit 154 of FIG. 1.

The video decoder 200 comprises further units that are also present in the video encoder 100 like e.g. an inverse quantization unit 210, an inverse transform unit 212, and a loop filtering unit 220, which respectively correspond to the inverse quantization unit 110, the inverse transform unit 112, and the loop filtering unit 120 of the video coder 100.

An entropy decoding unit 204 is configured to decode the received encoded video bitstream and to correspondingly obtain quantized residual transform coefficients 209 and signaling information. The quantized residual transform coefficients 209 are fed to the inverse quantization unit 210 and an inverse transform unit 212 to generate a residual block. The residual block is added to a prediction block 265 and the addition is fed to the loop filtering unit 220 to obtain the decoded video. Frames of the decoded video can be stored in the decoded picture buffer 230 and serve as a decoded picture 231 for inter prediction.

It is noted that the entropy decoding unit 204 may implement the above described decoder. In particular, the entropy decoding unit may correspond to the decoder which parses from the bitstream the signal samples as well as the syntax element values and then demaps the corresponding control information content based on a semantic rule.

According to an embodiment, the bitstream parser is configured to perform the parsing of the syntax element value by applying a context-adaptive binary arithmetic decoding.

Figure 4:
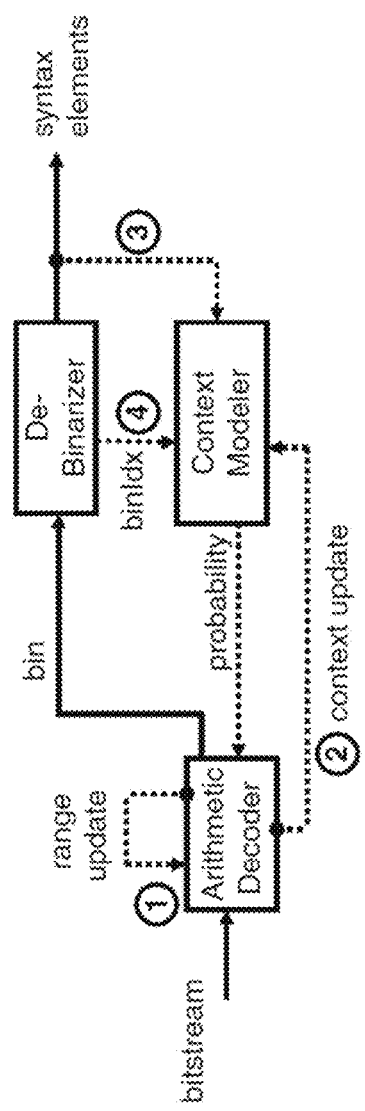
FIG. 4 is a block diagram illustrating a parser including an arithmetic decoder.

FIG. 4 illustrates arithmetic decoding as used in HEVC and corresponding to the arithmetic encoding shown in FIG. 3. In particular, the CABAC decoder in FIG. 4 can decode the bitstream encoded with the encoder as described with reference to FIG. 3.

The bitstream is entered to an arithmetic decoder which decodes the binary values based on the context model provided by the context modeler. The binary values derived are then input to the debinarizer which provides a syntax element value.

Generally, the intra prediction units 154 and 254 of FIGS. 1 and 2 can use reference samples from an already encoded area to generate prediction signals for blocks that need to be encoded or need to be decoded.

The entropy decoding unit 204 receives as its input the encoded bitstream 171. In general, the bitstream is at first parsed, i.e. the signaling parameters and the residuals are extracted from the bitstream. Typically, the syntax and semantic of the bitstream is defined by a standard so that the encoders and decoders may work in an interoperable manner.

As described in the above Background section, the encoded bitstream does not only include the prediction residuals. In case of motion compensated prediction, a motion vector indication is also coded in the bitstream and parsed therefrom at the decoder. The motion vector indication may be given by means of a reference picture in which the motion vector is provided and by means of the motion vector coordinates. So far, coding the complete motion vectors was considered. However, also only the difference between the current motion vector and the previous motion vector in the bitstream may be encoded. This approach allows exploiting the redundancy between motion vectors of neighboring blocks.

In order to efficiently code the reference picture, the H.265 codec (ITU-T, H265, Series H: Audiovisual and multimedia systems: High Efficient Video Coding) provides a list of reference pictures assigning list indices to respective reference frames. The reference frame is then signaled in the bitstream by including therein the corresponding assigned list index. Such list may be defined in the standard or signaled at the beginning of the video or a set of a number of frames. It is noted that in H.265 there are two lists of reference pictures defined, called L0 and L1. The reference picture is then signaled in the bitstream by indicating the list (L0 or L1) and indicating an index in that list associated with the desired reference picture. Providing two or more lists may have advantages for better compression. For instance, L0 may be used for both uni-directionally inter-predicted slices and bi-directionally inter-predicted slices while L1 may only be used for bi-directionally inter-predicted slices. However, in general the present disclosure is not limited to any content of the L0 and L1 lists.

The lists L0 and L1 may be defined in the standard and fixed. However, more flexibility in coding/decoding may be achieved by signaling them at the beginning of the video sequence. Accordingly, the encoder may configure the lists L0 and L1 with particular reference pictures ordered according to the index. The L0 and L1 lists may have the same fixed size. There may be more than two lists in general. The motion vector may be signaled directly by the coordinates in the reference picture. Alternatively, as also specified in H.265, a list of candidate motion vectors may be constructed and an index associated in the list with the particular motion vector can be transmitted. The motion vectors, the lists, the type of prediction and the like are all syntax elements for the encoding of which the present disclosure may also be applied.

Motion vectors of the current block are usually correlated with the motion vectors of neighboring blocks in the current picture or in the earlier coded pictures. This is because neighboring blocks are likely to correspond to the same moving object with similar motion and the motion of the object is not likely to change abruptly over time. Consequently, using the motion vectors in neighboring blocks as predictors reduces the size of the signaled motion vector difference. The Motion Vector Predictors (MVPs) are usually derived from already encoded/decoded motion vectors from spatial neighboring blocks or from temporally neighboring blocks in the co-located picture. In H.264/AVC, this is done by doing a component wise median of three spatially neighboring motion vectors. Using this approach, no signaling of the predictor is required. Temporal MVPs from a co-located picture are only considered in the so called temporal direct mode of H.264/AVC. The H.264/AVC direct modes are also used to derive other motion data than the motion vectors. Hence, they relate more to the block merging concept in HEVC. In HEVC, the approach of implicitly deriving the MVP was replaced by a technique known as motion vector competition, which explicitly signals which MVP from a list of MVPs, is used for motion vector derivation. The variable coding quad-tree block structure in HEVC can result in one block having several neighboring blocks with motion vectors as potential MVP candidates. Taking the left neighbor as an example, in the worst case a 64×64 luma prediction block could have 16 4×4 luma prediction blocks to the left when a 64×64 luma coding tree block is not further split and the left one is split to the maximum depth.

Advanced Motion Vector Prediction (AMVP) was introduced to modify motion vector competition to account for such a flexible block structure. During the development of HEVC, the initial AMVP design was significantly simplified to provide a good trade-off between coding efficiency and an implementation friendly design. The initial design of AMVP included five MVPs from three different classes of predictors: three motion vectors from spatial neighbors, the median of the three spatial predictors and a scaled motion vector from a co-located, temporally neighboring block. Furthermore, the list of predictors was modified by reordering to place the most probable motion predictor in the first position and by removing redundant candidates to assure minimal signaling overhead. The final design of the AMVP candidate list construction includes the following two MVP candidates: a) up to two spatial candidate MVPs that are derived from five spatial neighboring blocks; b) one temporal candidate MVPs derived from two temporal, co-located blocks when both spatial candidate MVPs are not available or they are identical; and c) zero motion vectors when the spatial, the temporal or both candidates are not available. Details on motion vector determination can be found in the book by V. Sze et al. (Ed.), High Efficiency Video Coding (HEVC): Algorithms and Architectures, Springer, 2014, in particular in Chapter 5, incorporated herein by reference.

In order to further improve motion vector estimation without further increase in signaling overhead, it may be beneficial to further refine the motion vectors derived at the encoder side and provided in the bitstream. The motion vector refinement may be performed at the decoder without assistance from the encoder. The encoder in its decoder loop may employ the same refinement to obtain corresponding motion vectors. Motion vector refinement is performed in a search space which includes integer pixel positions and fractional pixel positions of a reference picture. For example, the fractional pixel positions may be half-pixel positions or quarter-pixel or further fractional positions. The fractional pixel positions may be obtained from the integer (full-pixel) positions by interpolation such as bi-linear interpolation.

In a bi-prediction of current block, two prediction blocks obtained using the respective first motion vector of list L0 and the second motion vector of list L1, are combined to a single prediction signal, which can provide a better adaptation to the original signal than uni-prediction, resulting in less residual information and possibly a more efficient compression.

Since at the decoder, the current block is not available since it is being decoded, for the purpose of motion vector refinement, a template is used, which is an estimate of the current block and which is constructed based on the already processed (i.e. coded at the encoder side and decoded at the decoder side) image portions.

First, an estimate of the first motion vector MV0 and an estimate of the second motion vector MV1 are received as input at the decoder 200. At the encoder side 100, the motion vector estimates MV0 and MV1 may be obtained by block matching and/or by search in a list of candidates (such as merge list) formed by motion vectors of the blocks neighboring to the current block (in the same picture or in adjacent pictures). MV0 and MV1 are then advantageously signaled to the decoder side within the bitstream. However, it is noted that in general, also the first determination stage at the encoder could be performed by template matching which would provide the advantage of reducing signaling overhead.

At the decoder side 200, the motion vectors MV0 and MV1 are advantageously obtained based on information in the bitstream. The MV0 and MV1 are either directly signaled, or differentially signaled, and/or an index in the list of motion vector (merge list) is signaled. However, the present disclosure is not limited to signaling motion vectors in the bitstream. Rather, the motion vector may be determined by template matching already in the first stage, correspondingly to the operation of the encoder. The template matching of the first stage (motion vector derivation) may be performed based on a search space different from the search space of the second, refinement stage. In particular, the refinement may be performed on a search space with higher resolution (i.e. shorter distance between the search positions).

An indication of the two reference pictures RefPic0 and RefPic1, to which respective MV0 and MV1 point, are provided to the decoder as well. The reference pictures are stored in the decoded picture buffer at the encoder and decoder side as a result of previous processing, i.e. respective encoding and decoding. One of these reference pictures is selected for motion vector refinement by search. A reference picture selection unit of the apparatus for the determination of motion vectors is configured to select the first reference picture to which MV0 points and the second reference picture to which MV1 points. Following the selection, the reference picture selection unit determines whether the first reference picture or the second reference picture is used for performing of motion vector refinement. For performing motion vector refinement, the search region in the first reference picture is defined around the candidate position to which motion vector MV0 points. The candidate search space positions within the search region are analyzed to find a block most similar to a template block by performing template matching within the search space and determining a similarity metric such as the sum of absolute differences (SAD). The positions of the search space denote the positions on which the top left corner of the template is matched. As already mentioned above, the top left corner is a mere convention and any point of the search space such as the central point can in general be used to denote the matching position.

According to the above mentioned document JVET-D0029, the decoder-side motion vector refinement (DMVR) has as an input the initial motion vectors MV0 and MV1 which point into two respective reference pictures RefPict0 and RefPict1. These initial motion vectors are used for determining the respective search spaces in the RefPict0 and RefPict1. Moreover, using the motion vectors MV0 and MV1, a template is constructed based on the respective blocks (of samples) A and B pointed to by MV0 and MV1 as follows:

Template=function(Block $A$,Block $B$).

The function may be a sample clipping operation in combination with sample-wise weighted summation. The template is then used to perform template matching in the search spaces determined based on MV0 and MV1 in the respective reference pictures 0 and 1. The cost function for determining the best template match in the respective search spaces is SAD(Template, Block candA'), where block candA' is the candidate coding block which is pointed by the candidate MV in the search space spanned on a position given by the MV0. The same template is used to find best matching block B' and the corresponding motion vector MV1' which points to a block B'. In other words, after the template is constructed based on the block A and B pointed to by the initial motion vectors MV0 and MV1, the refined motion vectors MV0' and MV1' are found via search in RefPic0 and RefPic1 with the template.

Figure 5:
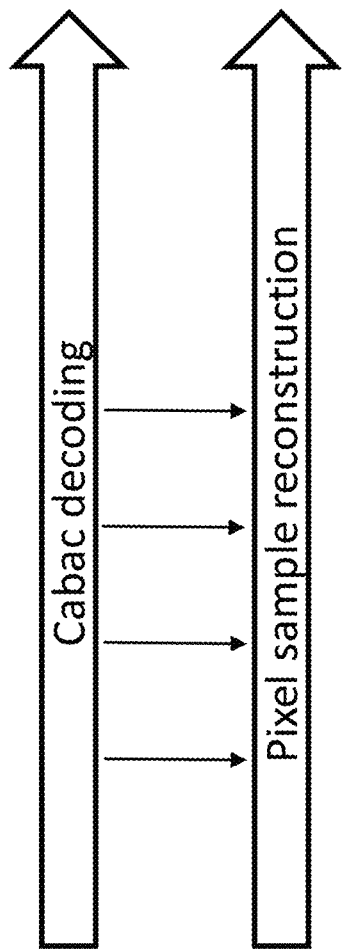
FIG. 5 is a schematic drawing illustrating separation of compression and binarization.

The above described encoder/decoder maintains decoupled CABAC encoding/decoding from the respective pixel sample reconstruction as is illustrated in FIG. 5. It is a highly desirable attribute of the state of a codec. Both H.264/AVC and H.265/HEVC follow this design principle. For the decoding operation, in the state of the art video codecs entropy decoding process is completely decoupled from the sample reconstruction. This means that the values of reconstructed samples are not required for decoding of the syntax elements by the entropy decoder. This requirement is provided mainly due to two reasons: 1) avoiding parsing dependency—the pixel reconstruction process usually requires temporal or spatial neighboring samples. It might be common is some applications that the neighboring sample is not reconstructed correctly. If entropy decoding is not decoupled, then the syntax elements would be corrupted. Another reason is hardware implementation: Recent computing platforms utilize multi core implementations. Usually CABAC decoding is performed by a separate engine in parallel to the sample reconstruction. If there is any dependency from sample reconstruction to CABAC decoding, then the CABAC engine is slowed down considerably (needs to wait for the pixel sample reconstruction).

Motivation for the present disclosure is a usage of the reconstructed pixel samples for syntax prediction for improved coding gain. At the same time the decoupled entropy coding—pixel reconstruction design is obeyed.

As described above, according to the present disclosure, the meaning (semantics) of the value of a syntax element (mapping) is selected depending on an index generated by a function calculated based on the values of previously reconstructed samples.

The reconstructed samples in this sense may be: reconstructed samples 215, loop-filtered reconstructed samples 221, decoded samples 231/232 in decoder 200 in FIG. 2. Correspondingly, the reconstructed samples can be reconstructed samples 115, loop-filtered reconstructed samples 121, decoded samples 130/231 in encoder 100 of FIG. 1. In more general terms, the samples can even be transformed samples before reconstruction 113 and prediction signal 165 in the encoder and respective transformed samples 213 and prediction signal 265 in the decoder. When added together, they provide the reconstructed pixel samples.

The proceeding syntax elements (in coding order) are only allowed to refer the value of the syntax element (shall be independent of semantics of the syntax element).

Figure 6:
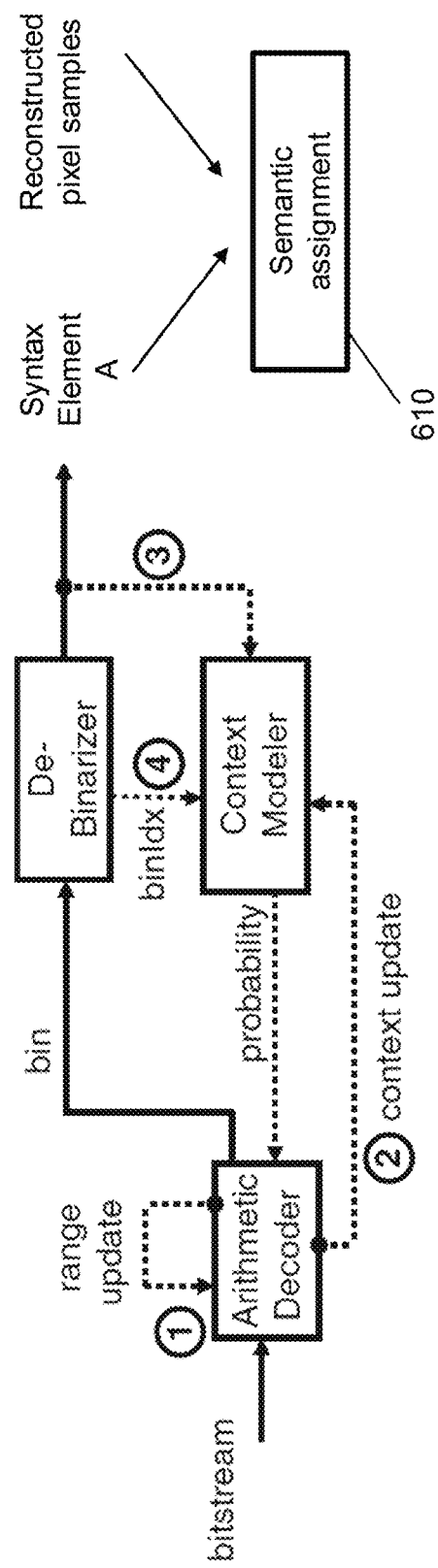
FIG. 6 is a block diagram illustrating s parser which switched semantic according to compression.

FIG. 6 illustrates a modified decoder from FIG. 4 according to an exemplary embodiment. In particular, the entropy decoder implementing CABAC delivers a syntax element A. This syntax element is then provided to the demapper 610, which also makes use of previously reconstructed signal samples (one or more) to determine the semantic rule and demap the syntax element to control information content according to the semantic rule.

According to an embodiment, the semantic rule is determined as an index identifying one of a plurality of predefined tables associating the control information content and the respective values of the syntax element, the index being determined as a function of the reconstructed signal sample. In this context, a table is any set of index values respectively associated with the signaling information content. There does not need to be any table structure stored. The association information may be generated on the run, e.g. by an algorithm, and/or stored in a form/structure different from a table, such as a list or a text file or anything else.

Figure 7:
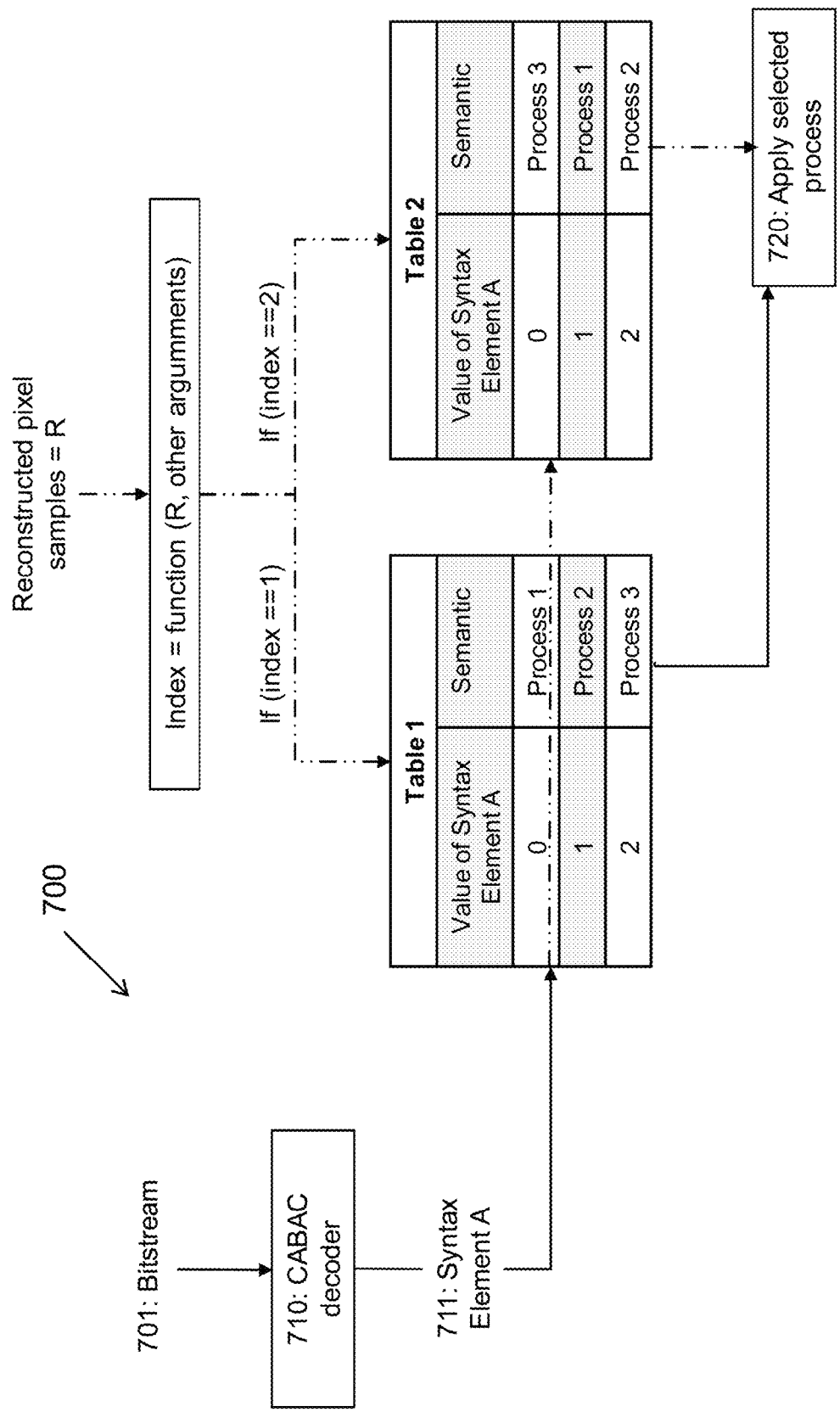
FIG. 7 is a schematic drawing of a decoder side processing from parsing of the bitstream to syntax element decoding.
Figure 8:
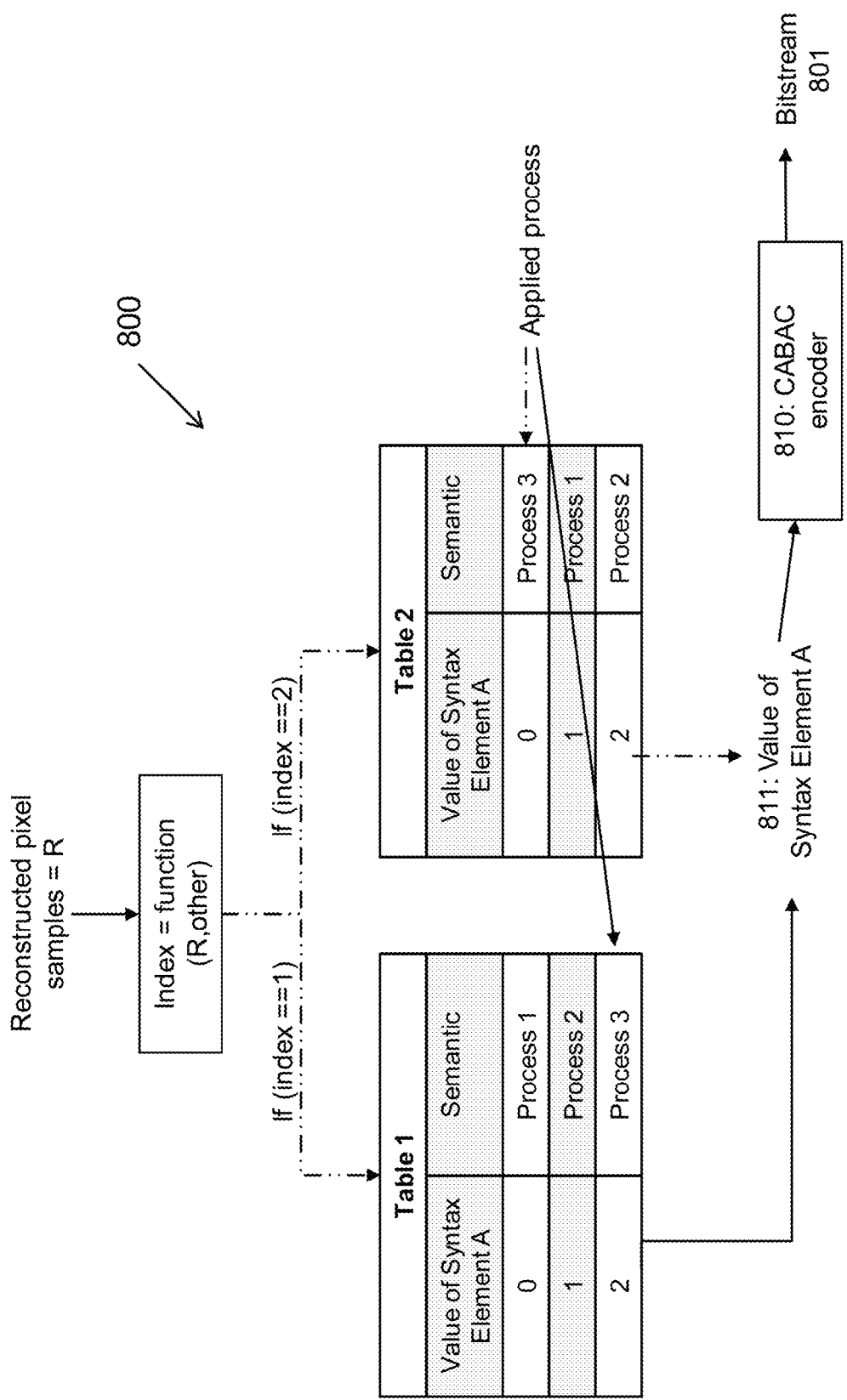
FIG. 8 is a schematic drawing of an encoder side processing syntax element formation to binarization.

FIGS. 7 and 8 illustrate examples of decoding and encoding according to the above embodiment. As can be seen from these Figures, at the decoder side (FIG. 7) as well as the encoder side (FIG. 8), there are two tables Table 1 and Table 2 available. Both tables associate the same values of a syntax element (exemplary syntax element A) with the respective control information contents. However, the associations in Table 1 and Table 2 differ from each other. In particular, values 0, 1, and 2 of syntax element A in Table 1 are respectively associated with process 1, process 2, and process 3. Process 1, process 2, and process 3 may define for instance a process to be performed when coding one or more signal samples. Values 0, 1, and 2 of syntax element A in Table 2 are respectively associated with process 3, process 1, and process 2.

In other words, the semantic rule is either a first table or a second table and the syntax element can take either a first value or a second value. The first table associates the first value of the syntax element with a first control information content and a second value with a second control information content. The second table associates the first value of the syntax element with the second control information content and the second value with the first control information content.

FIG. 7 shows a bitstream 701 entering a decoder (decoding process) 700. In order to parse a syntax element from the bitstream, CABAC decoder 710 as mentioned above is used. After application of the CABAC decoder, syntax element A 711 is obtained. In order to interpret the syntax element A, which may take one of the values 0, 1, 2, a semantic association has to be known to the decoder 700. In this example, the semantic information is a table, one of Table 1 and Table 2. The decision on which one of Table 1 and Table 2 is used is made according to previously reconstructed one or more signal samples R. In particular, a table index may be determined as a function of the previously reconstructed one or more samples R. The function may have further arguments, for instance the syntax element (A in this case), and/or other control parameters. The other argument might for instance be a control information indicating the size of the coding block, or a control information indicating whether a specific coding process is enabled/disabled for the coded video sequence (i.e. control flags in Sequence Parameter Set, SPS, of H.265 video coding standard). The index in this example may take either value 1 or value 2. Value 1 is associated with Table 1 and value 2 is associated with Table 2. Accordingly, depending on the index, the table is selected. Let us assume that syntax element A parsed from the bitstream has the value 0. In such case, if the table index has the value 1, Table 1 is used and the content of the signaling information is process 1. If, on the other hand, the table index has the value 2, Table 2 is used and the content of the signaling information is process 3. Process 1 and process 3 may represent two different approaches to decode the signal samples (to be) parsed from the bitstream. After the signaling information content is identified, it is used to control the decoding of the signal samples in the signal sample decoder 720.

The signal samples corresponding to a sample block are encoded into the bitstream (and decoded from the bitstream) according to a block scanning rule that is for instance defined in a video coding standard. Block based hybrid video coding standards such as H.265 employ sample block scanning rules such as "Z-Scan order" or "Raster scan order" that describe how a picture frame is partitioned into sample blocks and in which order the signal samples corresponding to a sample block must be inserted (or retrieved from) the bitstream.

FIG. 8 illustrates the corresponding encoder 800. In particular, syntax element A is to be encoded and inserted into the bitstream 801 (which should correspond to the bitstream 701 in FIG. 7, if no error in the transmission/reading of the bitstream occurred).

It is noted that the above examples refer to two tables Table 1 and Table 2. However, the present disclosure is not limited thereto and in general, any number of tables may be used. In such cases, the function of the previously coded/decoded signal samples may take different values corresponding to the respective different tables defined for associating syntax element value with the respective control information content which in this example is process 3. The control information content maps on the syntax element value either by Table 1 or by Table 2. Which one of these tables is to be applied is decided based on the previously reconstructed one or more signal samples, in the same way as described above with reference to FIG. 7. Accordingly in FIG. 8, a function of the previously reconstructed sample(s) and possibly further parameters returns a table index which is associated either with Table 1 or with Table 2. If the table index is 1, then Table 1 is used and the content of the control information "process 3" is coded by the syntax element value 2. If the table index is 2, then Table 2 is used and the content of the control information "process 3" is coded by the syntax element value 0. The syntax element value 811 obtained according to the table index is then encoded by the CABAC encoder 810, resulting in a portion of a bitstream added to the bitstream carrying the syntax elements corresponding to the control information and syntax elements corresponding to the coded signal samples. Moreover, process 3 is used to encode some further signal samples.

A first exemplary implementation concerns video coding. Accordingly, the signal is a video signal and the control information indicates with the first control information content a bi-prediction and with the second control information content a uni-prediction to be used in template matching to obtain signal sample predictor. In particular, the first or second table is selected according to template matching cost function which is based on similarity between the template and respectively a predictor based on bi-prediction and a predictor based on uni-prediction.

Motion vector derivation techniques are sometimes also referred to as frame rate up-conversion (FRUC) or decoder side motion vector derivation (DMVD). The initial motion vectors MV0 and MV1 may generally be indicated in the bitstream to ensure that encoder and decoder may use the same initial point for motion vector refinement. Alternatively, the initial motion vectors may be obtained by providing a list of initial candidates including one or more initial candidates. For each of them a refined motion vector is determined and at the end, the refined motion vector minimizing the cost function is selected.

An alternative template matching with respect to the template matching for bi-prediction and which is also applicable for uni-prediction can be found in document JVET-A1001, an in particular in Section "2.4.6. Pattern matched motion vector derivation" of document JVET-A1001 which is titled "Algorithm Description of Joint Exploration Test Model 1", by Jianle Chen et al. and which is accessible at: phenix.it-sudparis.eu/jvet/. The template in this template matching approach is determined as samples adjacent to the current bock in the current frame. The already reconstructed samples adjacent to the top and left boundary of the current block may be taken, referred to as "L-shaped template".

Another type of motion vector derivation may also be used. The input to the motion vector derivation process is a flag that indicates whether or not the motion vector derivation is applied. Implicitly, another input to the derivation process is the motion vector of a neighboring (temporally or spatially) previously coded/reconstructed block. The motion vectors of a plurality of neighboring blocks are used as candidates for the initial search step of motion vector derivation. The output of the process is MV0' (possibly also MV1', if bi-prediction is used) and the corresponding reference picture indices refPict0 and possibly refPict1 respectively. The motion vector refinement stage then includes the template matching as described above. After finding the refined one (uni-prediction) or more (bi-prediction/multi-frame prediction) motion vectors, the predictor of the current block is constructed (for bi/multi-prediction by weighted sample prediction, otherwise by referring to the samples pointed to by MV refined).

The present disclosure is not limited to the 2 template matching methods described above. As an example a third template matching method which is called bilateral matching (also described in the document JVET-A1001), can also be used for motion vector refinement and the disclosure applies similarly. According to bilateral matching, best match between two blocks along the motion trajectory of the current block in two different reference pictures is searched. Under the assumption of continuous motion trajectory, the motion vectors MV0 and MV1 pointing to the two reference blocks shall be proportional to the temporal distances, i.e., TD0 and TD1, between the current picture and the two reference pictures. In bilateral matching a cost function such as SAD(Block cand0', Block cand1') might be used where Block cand0' is pointed by MV0 and Block cand1' is pointed by MV1.

As explained above, the FRUC is a decoder side motion vector derivation tool that uses template matching to determine the motion vectors of a prediction block. In order to select between prediction direction (uni-prediction, bi-prediction) for a particular block of image samples, syntax element FRUC_prediction_direction may be inserted into the bitstream. The syntax element here selects between uni-prediction and bi-prediction for FRUC template matching. In other words, the syntax element determines whether template matching in either one or in two reference pictures is to be preformed. For example, the syntax and semantics mapping may be as follows:

Table 1 associates value 0 of syntax element FRUC_prediction_direction with FRUC bi-prediction and associates value 1 of the FRUC_prediction_direction with FRUC uni-prediction; and Table 2 associates value 1 of syntax element FRUC_prediction_direction with FRUC bi-prediction and associates value 0 of the FRUC_prediction_direction with FRUC uni-prediction.

The table selection function (a function which generates either index 1 or index 2 associated respectively with either Table 1 or Table 2) may be defined as follows:

Index=Template_matching_cost (Template,Candidate_block_$A$)<$K$+$M$*Template_matching_cost (Template,(Candidate_block_$A$+Candidate_block_$B$)/2)?2:1

In the above formula the notation "?2:1" can be interpreted as an "if . . . else" statement. If the condition (which is given by a smaller than operation) is evaluated as correct, the index is set equal to 2. If the condition is evaluated as false, the index is set equal to 1.

The first template matching cost expression "Template_matching_cost (Template, Candidate_block_A)" generates an estimation of the prediction error for uni-prediction. For example, the template matching cost may be calculated as the sum of absolute differences between the template and the best matching part of reference picture corresponding to candidate block A. In other words, block A is the candidate for prediction of the current block corresponding to the best matching block in one reference picture, i.e. block A is the result of the uni-prediction. The second cost function generates an estimation for bi-prediction prediction error. In other words, the second template matching cost expression "Template_matching_cost (Template, (Candidate_block_A+Candidate_block_B)/2)" corresponds to the template matching cost of the result of the bi-prediction. It may be defined as sum of absolute differences between the template and the predictor obtained by averaging best matching blocks found in respective two reference pictures. Here it is assumed that template matching with the block template as described above is used. The template may be obtained as a weighted mean of the blocks pointed to by initial motion vectors and the refined motion vectors by FRUC then either by uni-prediction or by bi-prediction depending on the template matching cost calculation. In the above expression for the template matching costs, a weighted average of blocks A and B in the respective different reference pictures is calculated with weights ½ and ½. However, the present disclosure is not limited thereto and the weights may be set in a different way, for instance proportionally to the distance (measured in time or number of pictures) between the current block to be coded/decoded and the respective reference pictures in which blocks A and B are located. Other weight settings are also possible as is clear to those skilled in the art. Similarly, weighted average calculated to obtain the block template may use the same or different weights.

In the above index calculation function, if the unequality: Template_matching_cost (Template, Candidate_block_A)< K+M*Template_matching_cost (Template, (Candidate_ block_A+Candidate_block_B)/2) is fulfilled (logical TRUE), then index value 2 pointing to Table 2 is selected. If the unequality is not fulfilled (logical FALSE), then the index value 1 pointing to Table 1 is selected. Numbers K and M are weighting factors. In one exemplary implementation, K=0 and M=1. However, it may be advantageous to set the weights differently to prefer either the uni-prediction or bi-prediction. For example, since bi-prediction usually results in better prediction due to the averaging effect (quantization noise on reference pictures are reduced), it may be beneficial to use a value K that is smaller than zero and a value M that is smaller than 1. In this case bi-prediction would be preferred over uni-prediction more often, which in turn would improve the prediction performance. The weights K and M can be set empirically and/or defined by standard or signaled in the bitstream.

In other words, as can be seen from the above example, the encoding and decoding as described above can be used for syntax element specifying whether for a motion vector refinement using template matching a uni-prediction or bi-prediction is to be used. Since the template matching is to be performed at both encoder and decoder, the template matching costs for already recovered samples (i.e. previously reconstructed block—at the encoder or the decoder) will be known at both sides and based on them, the semantic for the current samples (currently coded/decoded block) may be determined. In the above described example, the template was a block based template. However, the present disclosure is not limited thereto and in general, a template based on the samples (pixels) surrounding the current block may be used as well. In such case, the cost function may be calculated between the template and the corresponding portion of the reference picture surrounding the candidate block.

A second exemplary implementation concerns video coding. Accordingly, the signal is (again) a video signal. The control information indicates with the first control information content a local illumination compensation switched on and with the second control information content the local illumination compensation switched off. Moreover, the first or second table is selected according to a similarity function between the reconstructed sample in a current image frame and the corresponding reconstructed sample in an image frame preceding the current image frame in the encoding order.

Figure 13:
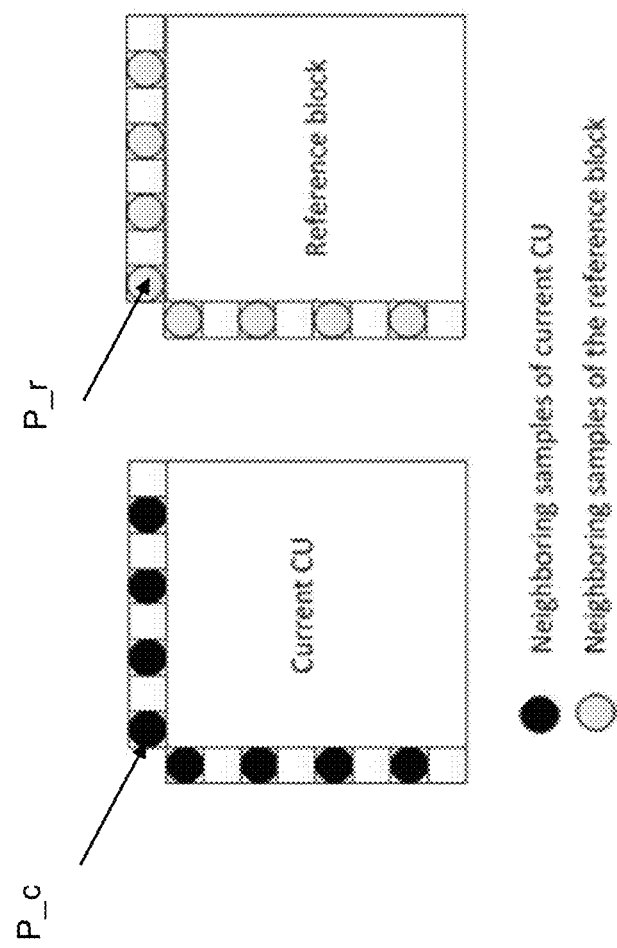
FIG. 13 is a schematic drawing illustrating LIC.

Local illumination compensation is a tool which may be used during video encoding and decoding (cf. Section 2.3.5 of Algorithm description of Joint Exploration Test Model 7 (JEM7), JVET-G1001 by Jianle Chen et al. available at website phenix.it-sudparis.eu/jvet/.). Local Illumination Compensation (LIC) is based on a linear model for illumination changes, using a scaling factor a and an offset b. It is enabled or disabled adaptively for each inter-mode coded coding unit (CU). When LIC applies for a CU, a least square error method is employed to derive the parameters a and b by using the neighbouring samples of the current CU and their corresponding reference samples. More specifically, the sub sampled (2:1 sub sampling) neighbouring samples of the CU and the corresponding samples (identified by motion information of the current CU or sub-CU) in the reference picture are used. The IC parameters are derived and applied for each prediction direction separately. General formula for deriving weights a and b may be minimizing the following expression SUM(a*P_c+b−P_r) for all P_c and P_r shown in FIG. 13. FIG. 13 shows a current coding unit (CU) with the pixel positions (sampleS) P_c which are immediately adjacent and already encoded/decoded. P_c are pixels which are subsampled 2:1 meaning that only every second position is taken. P_r are the samples located in the corresponding positions around the reference block.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively. Algorithm Description can be found in Algorithm description of Joint Exploration Test Model 7 (JEM 7), WET-G1001 by Jianle Chen et al. available at website phenix.it-sudparis.eu/jvet/.

The encoding and decoding of the present disclosure may be applied to syntax element LIC_flag which switches LIC on and off. For instance, the following syntax and semantics may be defined:

Table 1 defines the following association between the LIC_flag values and the LIC on/off control information: If the LIC_flag has value 0, then the LIC is to be set off (not to be applied). If, on the other hand, the LIC_flag has value 1, then the LIC is to be applied (set on).

Table 2 defines the following association between the LIC_flag values and the LIC on/off control information: If the LIC_flag has value 1, then the LIC is to be set off (not to be applied). If, on the other hand, the LIC_flag has value 0, then the LIC is to be applied (set on).

Figure 9:
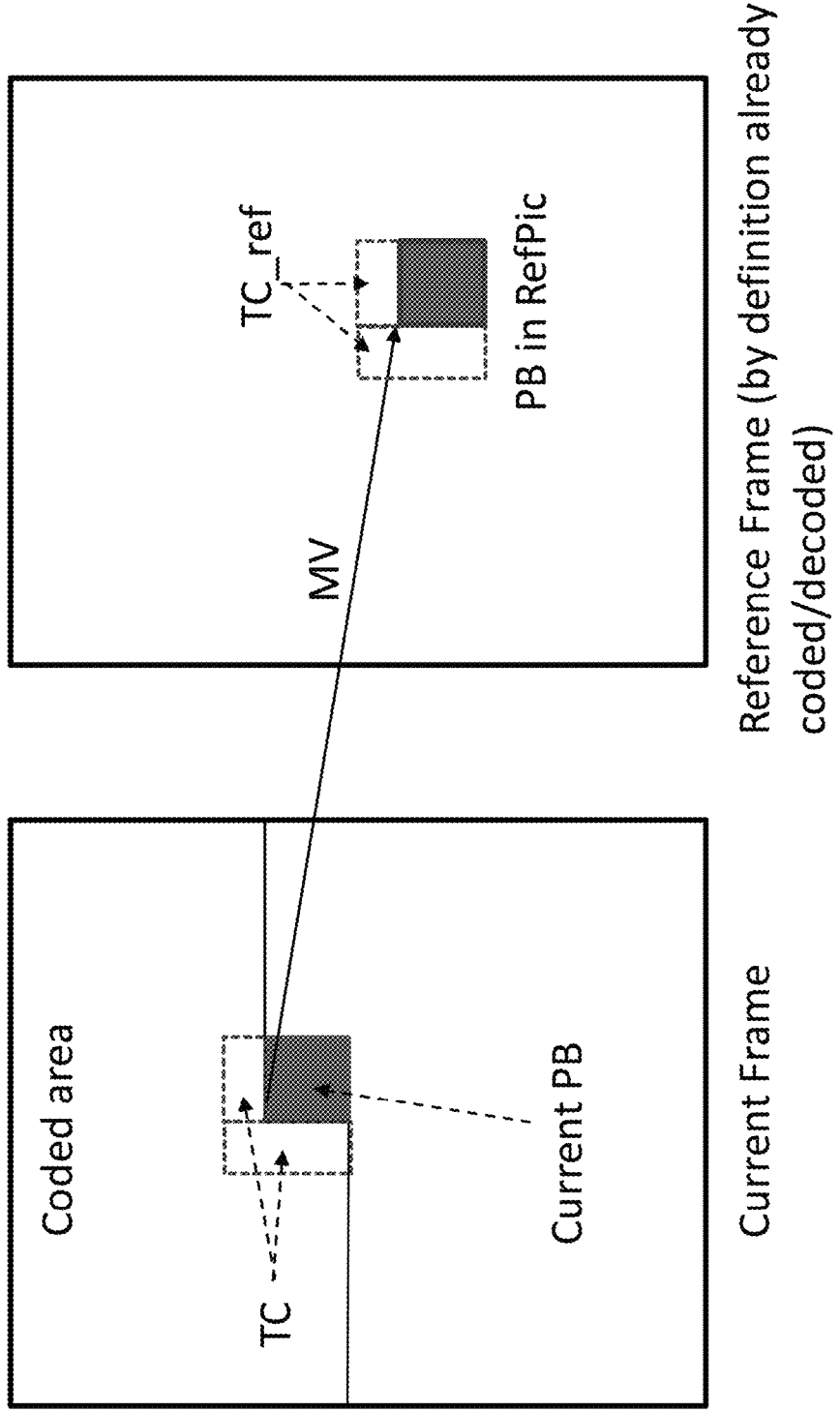
FIG. 9 is a schematic drawing illustrating distance metric for a cost function to determine semantic table for a LIC-related syntax element.

In order to find the index which points either to Table 1 or to Table 2, the following function may be used:

Index=distance(samples surrounding prediction block, corresponding samples in reference picture)<$Thr?2:1$ FIG. 9 illustrates the distance metric ("distance" above). The current frame includes current prediction block (PB) to be predicted. MV is motion vector resulting from the template matching or signaled and pointing to the best matching block in a reference picture (frame). This distance metric can be defined as SAD (TC, TC_ref). In this case the above mentioned Function(R, other arguments) is F(R)=SAD (TC, $TC_{ref}$)<Thr=r→1∧(SAD (TC, $TC_{ref}$)≥Thr→2). TC is a set of samples (pixels) surrounding the current block. TC_ref is a set of samples (pixels) surrounding the corresponding best matching block pointed to by MV. Thr is a threshold value that can be fixed, or adaptively selected or signaled. SAD can be replaced by any other distance cost function. The actual function and the samples that are used are only given as examples. In general all of the pixel samples that are decodable using the all of the previous syntax elements (in decoding order), excluding the syntax element in question (to be predicted) can be used. Moreover, the template is also only an example, other sizes and shapes (e.g. block template mentioned above) may also be used.

The index is determined based on a comparison of the distance between TC and TC_ref with a threshold Thr. If the distance is smaller than Thr, then Table 1 is to be selected (corresponding to index value 1). If the distance is larger (or equal), then Table 2 is to be selected (corresponding to index value 2). The distance measure may be signed or unsigned. Correspondingly, the threshold may be unsigned or signed. In case of SAD, the distance is unsigned and thus a threshold is unsigned as well. The threshold may be selected empirically by testing. It is noted that the subsampling 2:1 above is a mere example and no subsampling or a different subsampling may be applied in general.

A third exemplary implementation concerns video coding, too. Accordingly, the signal is a video signal. The control information indicates either a positive or a negative sign of a component of a motion vector, the component being a vertical or a horizontal component. Moreover, the first or second table is selected according to a similarity function between prediction blocks pointed to by motion vectors with the respective positive and negative sign and the samples surrounding the current block (to be coded/decoded).

In other words, syntax element MVD_sign_bit_X and/or syntax element MVD_sign_bit_Y may be encoded and/or decoded as described above. The syntax elements MVD_sign_bit_X and MVD_sign_bit_Y define the sign (plus or minus) of the x- and y-component of the motion vector difference.

Motion vector $MV_x$ of prediction block given by $MV_x=MV\_predictor_x+MVD\_sign\_bit\_X*MVD_x$. Since the motion vector has 2 components, the y-component is computed similarly as: $MV_y$ of prediction block $MV_y=MV\_predictor_y+MVD\_sign\_bit\_Y*MVD_y$. MV_predictor is an estimate (prediction)_of the motion vector (MV) of the prediction block. It is usually obtained using one or more of the motion vectors of the previously coded prediction blocks, $MVD_x$ is the motion vector difference (delta) that needs to be inserted into the bitstream to obtain MV of the prediction block. Further details concerning the motion vector coding can be found, for instance, in Section 5.2 "Motion Data Coding" of High Efficiency Video Coding (HEVC) Algorithms and Architectures, Vivienne Sze, Madhukar Bugadavi, Gary J. Sullivan.

The encoding and/or decoding of the present disclosure may be applied to the syntax element MVD_sign_bit_X and/or MVD_sign_bit_Y.

Then, for the syntax element MVD_sign_bit_X, the semantics tables may be defined as follows:
Table 1 defines value 0 of the syntax element MVD_sign_bit_X indicating that MV difference in X direction is positive. It defines value 1 of the syntax element MVD_sign_bit_X indicating that MV difference in X direction is negative.
Table 1 defines value 1 of the syntax element MVD_sign_bit_X indicating that MV difference in X direction is positive. It defines value 0 of the syntax element MVD_sign_bit_X indicating that MV difference in X direction is negative.

The same or different tables may be shared by or different tables may be defined for the syntax element MVD_sign_bit_Y.

In order to decide, which of the two tables is to be applied, an index is advantageously calculated as follows:
First 2 motion vectors are calculated as
$MV1_x=MV\_predictor_x+MVD_x$, $MV1_y=MV_y$
$MV2_x=MV\_predictor_x-MVD_x$, $MV2_y=MV_y$
Secondly the sample block in the reference picture pointed by $MV1_x$ is denoted by Pred1 and the sample block in the reference picture pointed by $MV2_x$ is denoted by Pred2.
Index is set equal to 1 if distance (samples surrounding block to be predicted, Pred1)<K+M*distance (samples surrounding block to be predicted, Pred2). Index is set equal to 2 otherwise.

Figure 10:
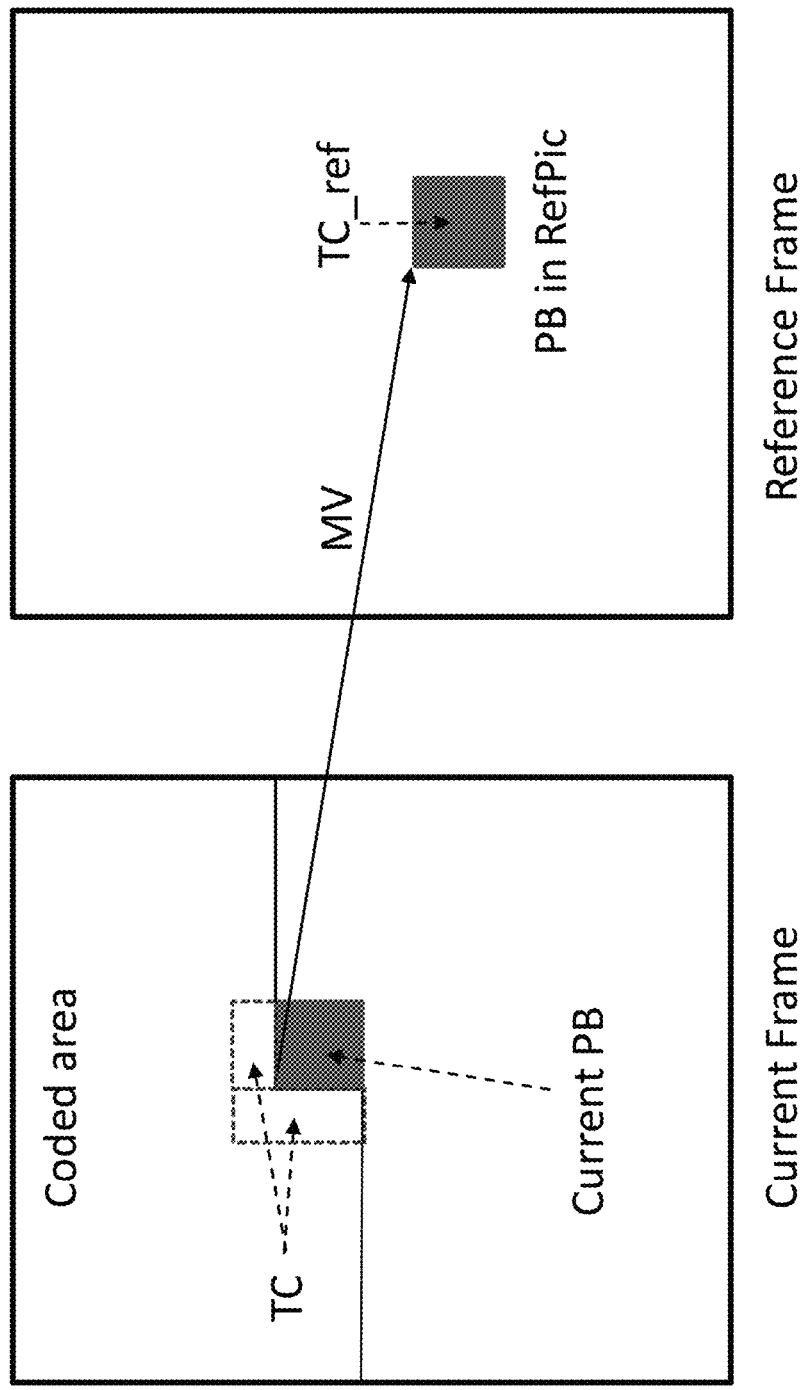
FIG. 10 is a schematic drawing illustrating distance metric for a cost function to determine semantic table for a syntax element related to a motion vector sign.

The distance is illustrated in FIG. 10. In particular, a distance metric can be defined as SAD (TC, TC_ref). The samples within the PB in reference picture are considered and compared with the surrounding samples of the current PB (block to be predicted). SAD can be replaced by any other distance cost function. In other words, the decision on which table is to be used is based on the distance between samples TC surrounding the current prediction block (PB) and samples TC_ref within the prediction block in the reference picture (frame) given the MVD_sign_bit_X is positive and given the MVD_sign_bit_X is negative. The prediction block PB in the reference picture is the block pointed to by the motion vector MV. The value of motion vector MV depends on the value of MVD_sign_bit_X, therefore depending on whether the MVD_sign_bit_X is positive or negative, 2 different values of the MV can be obtained, resulting in two different prediction blocks in the reference picture (denoted above by Pred1 and Pred2). If the distance for MVD_sign_bit_X positive (Pred1) is smaller than a weighted distance for MVD_sign_bit_X negative (Pred2), Table 1 is used. Otherwise, Table 2 is used. Similarly, the index may be calculated for the syntax element MVD_sign_bit_Y. As also in the first example described above (syntax element concerning uni/bi-prediction), the weights K and M may be set to K=0 and M=1, but it may be beneficial to set the values differently. The values of K and M in the present example may differ from the values K and M in the above first exemplary implementation.

A fourth exemplary implementation concerns video coding. The above examples are concerned with cases of syntax elements which can take two values and which only use two different tables. However, it is noted that the present disclosure is not to be limited to such examples. In general, the syntax elements may take any number of values while the number of tables remains 2 or may also be increased. In the following, fourth example, a loop filter index syntax element is encoded and/or decoded by applying encoder and/or decoder as described above. The loop filter index syntax element (which is signalled for a filtering region) indicates which filter needs to be used to filter a frame region. The variance function is used to estimate how noisy the signal inside the filtering region is (other functions can be used as well). The index value obtained after thresholding is used to switch between the syntax value-semantic mapping table.

In particular, the syntax element loop_filter_index indicates which filter is used. In this example, the loop_filter_index can take 3 values such as no filtering, weak filtering, and strong filtering. The corresponding syntax and semantics is shown below:
Table 1: loop_filter_index value 0 means that no filter is to be applied; value 1 means that a weak filter is to be applied; value 2 means that a strong filter is to be applied.
Table 2: loop_filter_index value 0 means that a weak filter is to be applied; value 1 means that no filter is to be applied; value 2 means that a strong filter is to be applied.
Table 3: loop_filter_index value 0 means that a strong filter is to be applied; value 1 means that a weak filter is to be applied; value 2 means that no filter is to be applied.

The terms weak and strong filter here refers to particular predetermined filters which are to be applied. For instance, in HEVC a strong filter and a weak filter are defined in a standard. This may be the case in this embodiment. However, alternatively, the filter parameter may also be signaled or the like.

The table (index associated with the respective table) may be selected as follows:

```
if (variance(X) < T1)
    index = 1
if (T1 < variance(X) < T2)
    index = 2
if (T2 < variance(X))
    index = 3
```

In the above decisions, the pixels within a region are defined as X. Thus, X is a set of region pixels to be used in the decision. The region here may be a CU, CTU, slice, tile, picture, or the like. It may be filtering region defined for the filtering purpose. Thresholds T1 and T2 may be determined empirically and preset in a standard or in encoder settings within the bitstream to be signaled to the decoder. The present disclosure is not limited to the variance. For instance, instead of variance, other measure such as a difference between a minimum and a maximum pixel value in the region may be used. Other metrics are possible.

In the above example, the number of tables and the number of syntax element values are the same. However, in general, the number of tables may be lower than the number of syntax element values. As a similar manner the number of tables can be more than the number of values.

In the examples given, the control information content in each table were the same, only the ordering (therefore assignment to the syntax element value) was different. In general the control information content can also differ between the tables. For example in the previous example the Table 3 can be given as follows (keeping the Table 1 and Table 2 the same).

Table 3: loop_filter_index value 0 means that strong filter is to be applied; value 1 means that a second strong filter is to be applied; value 2 means that a third strong filter is applied.

In the example above the second strong filter might be a filter that has similar characteristics to the strong filter, but with different filtering coefficients.

It is noted that the above embodiments of the encoder and decoder refer to respective functional units to perform the encoding, mapping, compression and the like. However, the above described embodiments may be implemented in an integrated circuit embodying the respective encoding and/or decoding apparatuses described above. Moreover, the encoder and decoder of the present disclosure may be implemented as a part of a video codec or an audio codec. It may be a part of a processing circuitry performing further functions in connection with the encoding and decoding of the signal. In general, the encoder and/or the decoder described above may be implemented in a combination of software and hardware. Correspondingly, methods for encoding and decoding are provided. For instance, FIG. 11 shows an encoding method while FIG. 12 shows a decoding method.

FIG. 11 shows a method for encoding a signal into a bitstream including signal samples and control information relating to encoding of signal samples. The method comprises a step of compressing 1130 a first signal sample and reconstructing the compressed first signal sample; a step of selecting 1140 a semantic rule for assignment between control information content and respective values of a syntax element according to the reconstructed first signal sample; determining a value of the syntax element based on the semantic rule and control information content; and generating a bitstream by binarizing 1150 the compressed first signal sample and the determined value of the syntax element.

Moreover, the signal samples may also be binarized 1150 after being coded using the coding mode given by the control information. The signal samples are input to be encoded 1110 and the coding mode is determined, after which the control information can be generated 1120.

Correspondingly, FIG. 12 shows a method for decoding a signal from a bitstream including signal samples and control information relating to decoding of signal samples. The method comprises parsing 1210 and 1220 from a bitstream a compressed first signal sample and a value of a syntax element respectively; reconstructing 1230 the compressed first signal sample; selecting 1240 a semantic rule for assignment between control information content and respective values of the syntax element according to the reconstructed first signal sample, and determining 1250 control information content based on the semantic rule and the parsed value of the syntax element. Based on the control information, further samples parsed from the bitstream may be decoded 1260.

Embodiments of the apparatus for encoding and/or apparatus for decoding may be implemented as hardware, firmware, software or any combination thereof. For example, the functionality of the apparatus/method for encoding or decoding may be performed by a processing circuitry with or without firmware or software, e.g. a processor, a microcontroller, a digital signal processor (DSP), a field programmable gate array (FPGA), an application-specific integrated circuit (ASIC), or the like.

The functionality of the apparatus for encoding (and corresponding method for encoding) and/or apparatus for decoding (and corresponding method for decoding) may be implemented by program instructions stored on a computer readable medium. The program instructions, when executed, cause a processing circuitry (e.g. a computer, processor or the like) to perform the steps of the method for encoding and/or decoding. The computer readable medium can be any medium, including non-transitory storage media, on which the program is stored such as a Blu ray disc, DVD, CD, USB (flash) drive, hard disc, server storage available via a network, etc.

Summarizing, the present disclosure relates to encoding and decoding of signal and syntax elements to/from a bitstream. In the encoding/decoding, semantics for the syntax elements is derived in accordance with previously decoded signal samples. Such encoding/decoding is applicable for instance to video or audio signal.

What is claimed is:

1. An apparatus for encoding a signal into a bitstream, the bitstream comprising a first signal sample and control information relating to encoding of a second signal sample, the apparatus comprising a processing circuitry configured to:
   compress the first signal sample and reconstruct the compressed first signal sample;
   select a semantic rule for assignment between control information contents and respective values of a syntax element according to the reconstructed first signal sample, the syntax element carrying control information content for the signal;
   determine a value of the syntax element based on the semantic rule and a control information content relating to the encoding of the second signal sample; and
   generate the bitstream by including into the bitstream the compressed first signal sample and the determined value of the syntax element.

2. The apparatus according to claim 1, wherein the processing circuitry generates the bitstream by binarizing the compressed first signal sample or the determined value of the syntax element.

3. The apparatus according to claim 2, wherein the processing circuitry is further configured to:
generate the control information content;
compress the second signal sample according to the generated control information content; and
binarize the compressed second signal sample and include the binarized second compressed signal sample into the bitstream.

4. The apparatus according to claim 2, wherein the processing circuitry is configured to perform the binarization of the syntax element value by applying a context-adaptive binary arithmetic coding.

5. The apparatus according to claim 1, wherein the semantic rule is selected as an index identifying one of a plurality of predefined tables associating the control information contents and the respective values of the syntax element, the index being determined as a function of the reconstructed first signal sample.

6. The apparatus according to claim 5, wherein:
the semantic rule is either a first table or a second table;
the syntax element can take a first value or a second value;
the first table associates the first value of the syntax element with a first control information content and a second value with a second control information content; and
the second table associates the first value of the syntax element with the second control information content and the second value with the first control information content.

7. The apparatus according to claim 6, wherein:
the signal is a video signal; and
the control information indicates with the first control information content a bi-prediction and with the second control information content a uni-prediction to be used in template matching to obtain a signal sample predictor.

8. The apparatus according to claim 7, wherein the first table or the second table is selected according to a template matching cost function, which is based on a similarity between a template and a predictor based on bi-prediction and a predictor based on uni-prediction.

9. The apparatus according to claim 6, wherein:
the signal is a video signal; and
the control information indicates with the first control information content a local illumination compensation switched on and with the second control information content the local illumination compensation switched off.

10. The apparatus according to claim 9, wherein the first table or the second table is selected according to a similarity function between the reconstructed sample in a current image frame and the corresponding reconstructed sample in an image frame preceding the current image frame in the encoding order.

11. The apparatus according to claim 6, wherein:
the signal is a video signal;
the control information indicates either a positive sign or a negative sign of a component of a motion vector, the component being a vertical component or a horizontal component.

12. The apparatus according to claim 11, wherein the first table or the second table is selected according to a similarity function between prediction blocks pointed to by motion vectors with the respective positive sign and the respective negative sign and the samples surrounding the current prediction block.

13. An apparatus for decoding a signal from a bitstream, the bitstream comprising signal samples and control information relating to decoding of the signal samples, the decoder comprising a processing circuitry configured to:
parse from the bitstream a compressed first signal sample, of the signal samples, and a value of a syntax element;
reconstruct the compressed first signal sample;
select a semantic rule for assignment between control information contents and respective values of the syntax element according to the reconstructed first signal sample, the syntax element carrying control information content for the signal; and
determine a control information content, of the control information contents, based on the semantic rule and the parsed value of the syntax element.

14. The apparatus according to claim 13, wherein the processing circuitry is further configured to:
parse from the bitstream a compressed second signal sample, of the signal samples; and
decompress the compressed second signal sample according to the determined control information content.

15. The apparatus according to claim 13, wherein the processing circuitry is configured to perform the parsing of the syntax element value by applying a context-adaptive binary arithmetic decoding.

16. A method for encoding a signal into a bitstream, the bitstream comprising a first signal sample and control information relating to encoding a second signal sample, the method comprising:
compressing the first signal sample and reconstructing the compressed first signal sample;
selecting a semantic rule for assignment between control information contents and respective values of a syntax element according to the reconstructed first signal sample, the syntax element carrying control information content for the signal;
determining a value of the syntax element based on the semantic rule and control information content relating to the encoding of the second signal sample; and
generating the bitstream by including into the bitstream the compressed first signal sample and the determined value of the syntax element.

17. A method for decoding a signal from a bitstream, the bitstream comprising signal samples and control information relating to encoding of the signal samples, the method comprising:
parsing from the bitstream a compressed first signal sample, of the signal samples, and a value of a syntax element;
reconstructing the compressed first signal sample;
selecting a semantic rule for assignment between control information contents and respective values of the syntax element according to the reconstructed first signal sample, the syntax element carrying control information content for the signal; and
determining a control information content, of the control information contents, based on the semantic rule and the parsed value of the syntax element.

18. A non-transitory computer-readable medium storing instructions which when executed on a processor perform the method according to claim 17.

* * * * *